United States Patent
Ajemian

(10) Patent No.: US 10,710,016 B2
(45) Date of Patent: *Jul. 14, 2020

(54) POLLUTION CONTROL SYSTEM

(71) Applicant: Robert C. Ajemian, Sparta, NJ (US)

(72) Inventor: Robert C. Ajemian, Sparta, NJ (US)

( * ) Notice: Subject to any disclaimer, the term of this patent is extended or adjusted under 35 U.S.C. 154(b) by 376 days.

This patent is subject to a terminal disclaimer.

(21) Appl. No.: 15/138,784

(22) Filed: Apr. 26, 2016

(65) Prior Publication Data
US 2016/0236129 A1 Aug. 18, 2016

Related U.S. Application Data

(63) Continuation-in-part of application No. 14/287,632, filed on May 27, 2014, now Pat. No. 9,327,224.

(60) Provisional application No. 61/827,191, filed on May 24, 2013.

(51) Int. Cl.
| | |
|---|---|
| B01D 46/00 | (2006.01) |
| B01D 47/06 | (2006.01) |
| B01D 50/00 | (2006.01) |
| B01D 53/00 | (2006.01) |
| B01D 53/76 | (2006.01) |
| B01D 53/75 | (2006.01) |
| B01D 53/78 | (2006.01) |

(52) U.S. Cl.
CPC ..... *B01D 46/0023* (2013.01); *B01D 46/0036* (2013.01); *B01D 46/0082* (2013.01); *B01D 47/06* (2013.01); *B01D 50/006* (2013.01); *B01D 50/008* (2013.01); *B01D 53/007* (2013.01); *B01D 53/75* (2013.01); *B01D 53/76* (2013.01); *B01D 53/78* (2013.01); *B01D 53/002* (2013.01); *B01D 2251/104* (2013.01); *B01D 2258/0275* (2013.01)

(58) Field of Classification Search
CPC ........... B01D 46/0023; B01D 46/0082; B01D 46/0036; B01D 53/44; B01D 53/76; B01D 53/002

See application file for complete search history.

(56) References Cited

U.S. PATENT DOCUMENTS

| | | |
|---|---|---|
| 3,242,652 A | 3/1966 | Malenchini |
| 3,785,124 A | 1/1974 | Gaylord |
| 4,084,947 A | 4/1978 | Ear |
| 4,323,373 A | 4/1982 | Fritz |

(Continued)

FOREIGN PATENT DOCUMENTS

EP 0857508 A1 8/1998

*Primary Examiner* — Sean E Conley
(74) *Attorney, Agent, or Firm* — Gearhart Law LLC

(57) ABSTRACT

A pollution control system for removing particle and gas phase pollutants in a waste airstream exhausted from commercial cooking operations may include a plurality of filters arranged within a housing for filtering particle and gas phase pollutants in the waste airstream. Various ones of the filters may be composed of a variety of different materials, and ozone may be provided within the housing to assist with removal of the pollutants. In some examples, a wash mechanism may be included to wash surfaces of a filter to remove grease therefrom. In some examples, the system may further include means to spray droplets (such as in a fog or mist form) into the waste airstream to condense a portion of gas phase pollutants into condensed particles.

23 Claims, 13 Drawing Sheets

(56) References Cited

U.S. PATENT DOCUMENTS

| | | | |
|---|---|---|---|
| 5,458,675 A * | 10/1995 | Morlec | B01D 53/0407 95/143 |
| 5,472,342 A | 12/1995 | Welsh, II et al. | |
| 5,820,828 A * | 10/1998 | Ferone | A61L 9/12 422/124 |
| 6,120,584 A * | 9/2000 | Sakata | B01D 53/02 55/524 |
| 7,614,396 B2 | 11/2009 | So | |
| 9,327,224 B2 * | 5/2016 | Ajemian | B01D 46/0023 |
| 2004/0120845 A1 * | 6/2004 | Potember | A61L 9/015 422/4 |
| 2004/0163540 A1 * | 8/2004 | Mori | A61L 9/014 96/134 |
| 2007/0240742 A1 | 10/2007 | Kwok et al. | |
| 2008/0286163 A1 * | 11/2008 | Garfield | A61L 9/205 422/120 |
| 2009/0042500 A1 | 2/2009 | Robison | A61L 9/20 454/67 |
| 2010/0071324 A1 * | 3/2010 | Alexander | B01D 39/1615 55/492 |
| 2012/0138478 A1 | 6/2012 | Yost, III et al. | |
| 2012/0247074 A1 | 10/2012 | Chmayssani et al. | |
| 2012/0317940 A1 | 12/2012 | Ball et al. | |
| 2013/0142692 A1 * | 6/2013 | Tarifi | A61L 9/205 422/4 |

* cited by examiner

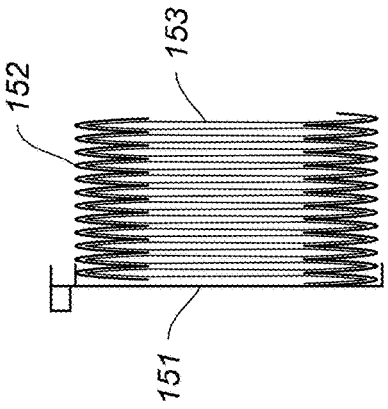
*FIG. 14*
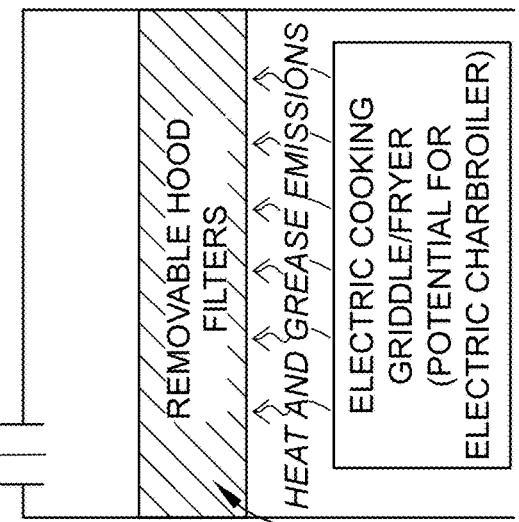
*FIG. 15*
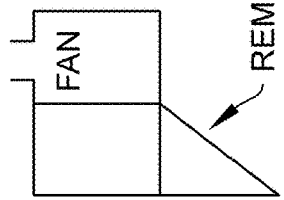
*FIG. 16*
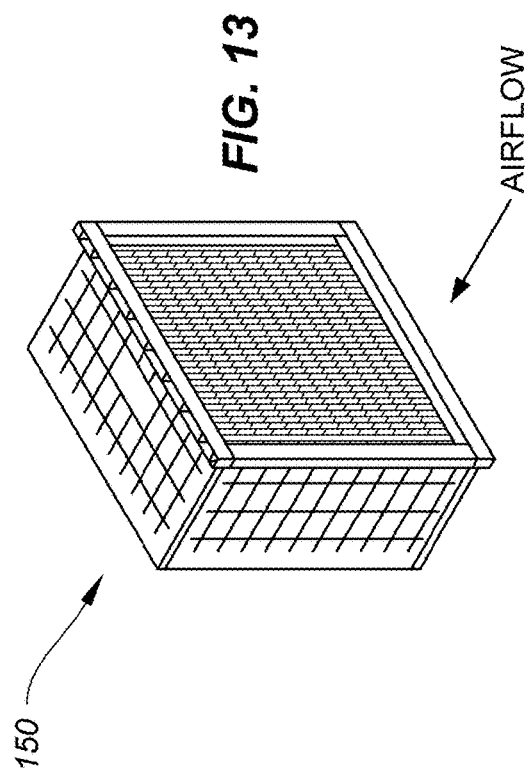
*FIG. 13*
*FIG. 17*

POLLUTION CONTROL SYSTEM

CROSS-REFERENCE TO RELATED APPLICATION

The present application is a continuation-in-part and claims the benefit under 35 U.S.C. § 120 and now allowed U.S. Patent Application No. 61/827,191 to the inventor, filed May 24, 2013, the entire contents of which is hereby incorporated by reference herein.

BACKGROUND

Field

Example embodiments in general relate to a pollution control system to remediate cooking emissions.

Related Art

The emission profile from commercial cooking operations has been well studied and shown to consist of particles (aerosols), semi-volatile organic compounds (sVOCs), volatile organic compounds (VOCs) and inorganic volatile species. The particles give rise to visual smoke and the VOCs give rise to odors.

The mass, size distribution and organic chemistry profile of the emissions can vary widely and are functions primarily of the type of cooking apparatus and the chemical and structural composition of the raw food being cooked. The most severe challenge to cooking emission remediation has been demonstrated repeatedly to be the emissions generated by gas char broiling of ground beef patties, with the severity of emissions being proportionately related to the fat content and the degree of well doneness of the beef patties. Of particular note is that the aerosol and chemical profiles of char broiled ground beef have been characterized and shown to not be dissimilar from the emission profile of diesel exhaust. Of particular concern are the National Ambient Air Quality Standards (NAAQS) and EPA Title V air toxics that are released. These include but are not limited to: PM2.5, PAH (poly aromatic hydrocarbons), butadienes, other toxic VOCs and ozone precursors. Indeed, air quality management districts in California are currently in the process of generating cooking emission remediation standards for char-broiling of beef, and the Bay Area Air Quality Management District (BAAQMD) has already promulgated such regulations.

Historically and currently, there are two established ways of remediating the particulate (aerosol) cooking emissions: removal from the airstream by electrostatic deposition onto alternatively charged plates or mechanical removal of the aerosols by passing the airstream through a series of progressively more efficient media filters. Established known mechanical filtration properties include impaction, interception, and interference.

Both technologies have been proven to be highly effective and there are advantages to choosing one over the other. The two main advantages of electrostatic precipitators have been first, the pressure drop through the filters is 50-75% less than through clean mechanical filters, with that difference becoming more pronounced as the mechanical filters load. For an electrostatic precipitator the pressure drop remains constant, whereas, as mechanical filters load, the resistance to airflow increases, thus decreasing the total air that can be exhausted in the kitchen hood. This is a concern for modern day low flow hoods. This condition often mandates a constant flow control system and/or filter change warning mechanisms. Second is that the electrostatic precipitators can be programmed for nightly washing, thus removing the grease from the duct pathway and decreasing the risk of fire presented by accumulated grease in the ducted system.

Mechanical filtration control devices are often favored because they typically cost less and are more fail-safe in that electrical components are not required for proper functioning. Mechanical filters are also easier to service because highly trained technicians are not required for routing maintenance. These mechanical systems typically have three stages of progressively more efficient filters with the three stages typically in the range (all efficiencies in MERV ratings):

1. STAGE 1—MERV 6-10,
2. STAGE 2—MERV 12-15, and
3. STAGE 3—(95-99) DOP up to HEPA (99.97) DOP, wherein the numbers in parentheses represent percentage of 0.3 micrometer particles removed.

A well-established mode exists at 0.2 micrometer diameter aerosols for char broiling beef, so the stage 3 filters are mandatory. These filters are expensive so the correct selection of the workhorse filters of stage 1 and stage 2 are paramount. The frequency of filter changing varies with the cooking load; however, the optimal scenario would be a month's duration for stages 1 and 2 and a quarterly duration for stage 3.

For both types of particulate control technologies, neither one significantly effects the removal of sVOCs or VOCs. This emissions component is either ignored, or more often (especially when cooking odor abatement is desired) removed by adsorption (with varying success) by a sorbent such as activated charcoal.

SUMMARY OF THE INVENTION

An example embodiment of the present invention is directed to an air pollution control system for removing particle and gas phase pollutants in a waste airstream exhausted from commercial cooking operations. The system includes a housing having an inlet and an outlet, an exhaust fan attached to the outlet for drawing the waste airstream into the inlet and through the housing to the outlet and discharging to the outside atmosphere, and a plurality of filters arranged in adjacent spaced relation along the length of the housing between the inlet and outlet for filtering the particle and gas phase pollutants in the waste airstream. The system includes a water droplet source adapted to spray water droplets into the inlet to mix with the incoming waste airstream, and a wash mechanism arranged in the housing in facing relation to a first of the plurality of filters, the wash mechanism including a plurality of spray nozzles supplying a mix of heated water and detergent for periodically washing surfaces of the first filter to remove grease therefrom.

Another example embodiment is directed to an air pollution control system for removing particle and gas phase pollutants in a waste airstream exhausted from commercial cooking operations. The system includes a housing having an inlet and an outlet, and an exhaust fan attached to the outlet for drawing the waste airstream into the inlet and through the housing to the outlet and discharging to the outside atmosphere. The system further includes a plurality of filters arranged in adjacent spaced relation along the length of the housing between the inlet and outlet for filtering the particle and gas phase pollutants in the waste airstream, wherein media of at least one of the filters is embodied as wool material.

Another example embodiment is directed to an air pollution control system for removing particle and gas phase pollutants in a waste airstream exhausted from commercial cooking operations. The system includes a housing having an inlet and an outlet, and an exhaust fan attached to the outlet for drawing the waste airstream into the inlet and through the housing to the outlet and discharging to the outside atmosphere. The system further includes a plurality of filters arranged in adjacent spaced relation along the length of the housing between the inlet and outlet for filtering the particle and gas phase pollutants in the waste airstream, and injection means adapted to inject ozone into the housing to decompose particle and gas phase pollutants within the waste airstream that are retained in the plurality of filters.

Another example embodiment is directed to an air pollution control system for removing particle and gas phase pollutants in a waste airstream exhausted from commercial cooking operations. The system includes a housing having an inlet and an outlet, and an exhaust fan attached to the outlet for drawing the waste airstream into the inlet and through the housing to the outlet and discharging to the outside atmosphere. The system further includes a plurality of filters arranged in adjacent spaced relation along the length of the housing between the inlet and outlet for filtering the particle and gas phase pollutants in the waste airstream, wherein one of the filters is embodied as a photocatalytic oxidation (PCO) filter which further includes a bank of UV-C lights.

Another example embodiment is directed to an air pollution control system for removing particle and gas phase pollutants in a waste airstream exhausted from commercial cooking operations. The system includes a housing having an inlet and an outlet, and an exhaust fan attached to the outlet for drawing the waste airstream into the inlet and through the housing to the outlet and discharging to the outside atmosphere. The system further includes a plurality of filters arranged in adjacent spaced relation along the length of the housing between the inlet and outlet for filtering the particle and gas phase pollutants in the waste airstream, wherein one of the filters includes a synthetic zeolite sorbent.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

FIG. 13 is a perspective front view of a stage III filter according to an example embodiment.

FIG. 14 is a cross-section of the stage III filter internals of FIG. 13.

FIG. 15 is a drawing of a recirculating (vent less) kitchen exhaust hood.

FIG. 16 is a side view of the drawing of FIG. 15.

FIG. 17 is a block diagram of a pollution control system according to an example embodiment configured for a recirculating (vent less) kitchen exhaust hood as shown in FIGS. 15 and 16.

DETAILED DESCRIPTION

Figure 1:
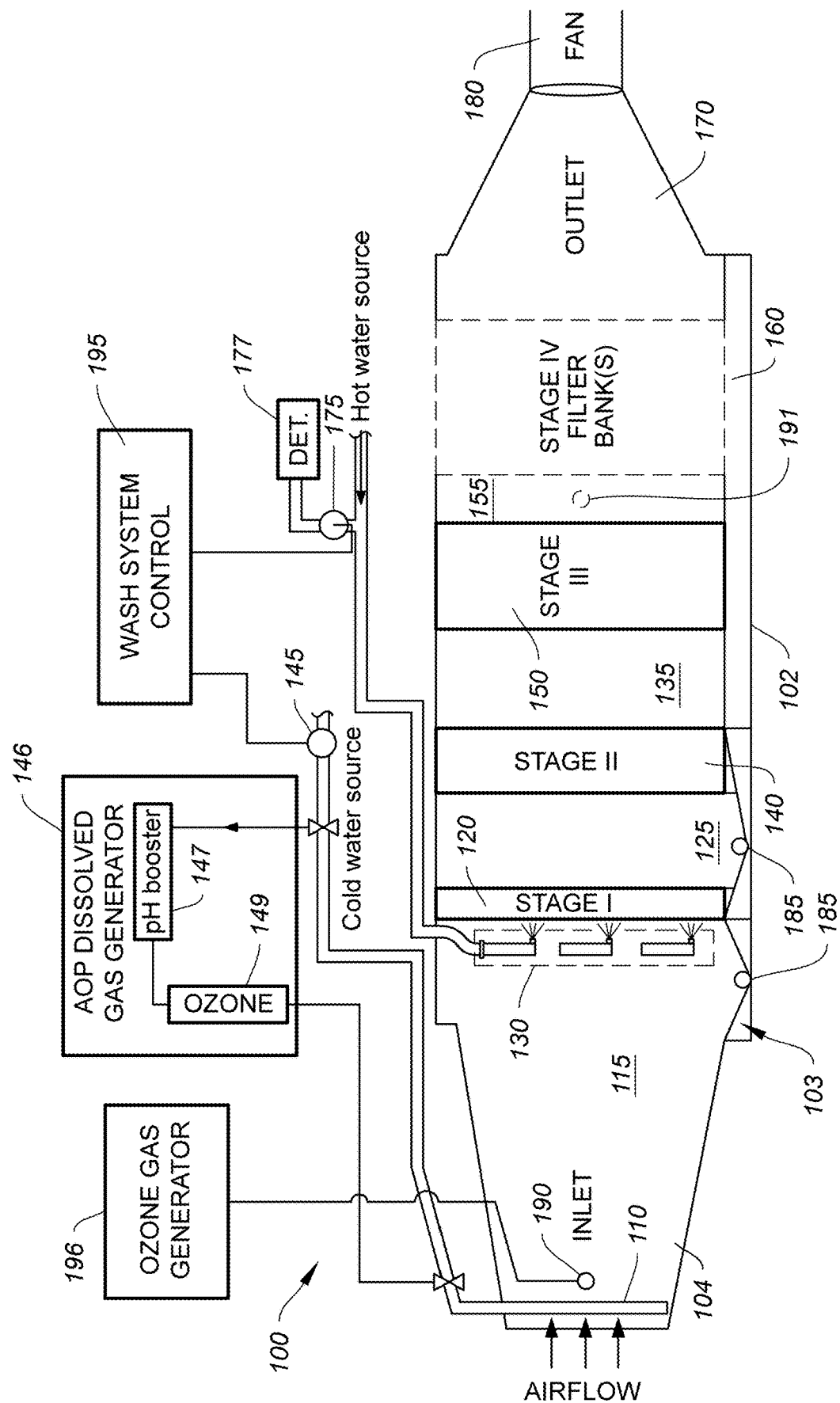
FIG. 1 is a block diagram of a pollution control system according to an example embodiment.

In general, and as to be shown in further detail below, example embodiments are directed to a mechanical filter-based air pollution control system having a washable first stage filter that removes particle pollutants such as grease and smoke, and gaseous odorous pollutants generated within a waste airstream from commercial cooking operations by a commercial kitchen cooking ventilation hood. The pollution control system incorporates novel and advanced chemical and physical technologies either separately or in combination to achieve maximal removal efficiencies of these air pollutants.

As to be shown in more detail hereafter, the system in one or more example embodiments may include a fogger assembly that is combined with a plurality of progressively more efficient filters arranged within the housing thereof, including a stage 1 reactor filter, a stage 2 combination wool/synthetic media layered filter, and a stage 3 oil-mist media filter that assimilates the characteristics and DOP ratings of a HEPA media filter, in an effort to achieve maximum removal of the total emissions from the waste airstream with minimal ongoing filter replacement cost. Alternatively, a low pressure drop >95 DOP nanofiber filter or an ozone-resistant glass 95DOP filter may be utilized for the stage 3 filter.

The system in one or more example embodiments may further include a wash mechanism provided for cleaning the stage 1 filter, thereby providing frequent and consistent grease removal from the filter, while eliminating the need to frequently replace a disposable type stage I filter. A disposable pleated stage I filter made of synthetic fiber or wool is also contemplated, in an alternative example embodiment. Additionally, an optional stage 4 filter comprising a proprietary synthetic hydrophobic zeolite sorbent, either alone or in combination with activated charcoal, may be incorporated to achieve maximum removal, retention and subsequent decomposition of the gas phase odorous pollutants from the waste airstream.

As to be explained in more detail below, in one or more example embodiments, oxidizing ozone may be injected into a housing of the system to oxidize both captured and uncaptured organic emissions. The ozone may be injected in a dissolved form within fog droplets that subsequently evaporate and release the ozone. Alternatively, the ozone may be injected into the housing in a gaseous form utilizing an ozone wand to distribute the ozone, or the ozone may be generated in-situ using UV-C lamps of a specified wavelength. Additionally as to be explained in further detail below, what is known as Advanced Oxidation Processes (AOP), which initiate when activated ozone (comprising ozone gas with a surplus of hydroxyl radicals (.OH)) is injected into or formed within the system to mix with the emissions in the waste airstream. These very short-lived AOP have significantly higher oxidation capacities to decompose both captured and non-captured waste particles and gases. The generation of AOP also serve to consume unused ozone prior to discharge to the environment.

The AOP may be initiated alone in a stage IV photocatalytic oxidation (PCO) filter, or by the UV-C lamp component of the PCO filter alone. Alternatively, one or more example embodiments may be directed to a system having a combination with the PCO filter serving as stage IV and a hydrophobic zeolite-based sorbent serving as a stage V filter of the system, in an effort to achieve maximum removal, retention and subsequent decomposition of the gas phase odorous pollutants from the waste airstream.

FIG. 1 is a block diagram of a pollution control system according to an example embodiment. As to be set forth more fully below, the example embodiments in general are directed to a pollution control system employing mechanical filters (e.g., no electrostatic filtering), with or without a wash mechanism. The system is designed to remediate cooking emissions such as can be found in the waste airstream emitted from a commercial kitchen cooking ventilation hood (not shown). The pollution control system 100 of FIG. 1 may be referred to as a "wet" system in that it utilizes water droplets sprayed as a fog into an inlet 104 thereof by a fogger assembly 110, and sprays hot feed water with cleaning agent therein onto a first stage filter 120 via a wash mechanism 130. This is as opposed to a "dry" system where no spray or moisture is used within the housing 102.

Additionally, cold feed water ported to the fogger assembly 110 from a cold water source is fed by way of a mechanically powered pump 145. As such, in the pollution control system 100 of FIG. 1, the fogger assembly 110 is powered by one of a mechanical or electrical source to spray a fog of water droplets having a diameter of 20 micrometers or less at the inlet 104, to mix with the incoming waste airstream (shown by "AIRFLOW" and arrows).

The aforementioned wash mechanism 130 is designed so as to effectively clean a first stage of mechanical filtration (shown by stage I filter 120). The stage I filter 120 is selected due to its high efficiency and "wash ability". Thus, one gains the benefit of nightly grease removal combined with a permanent, non-replaceable filter, and without the complexity of hi-voltage electronics or easily damaged electrostatic cells.

Salient components of the system 100 include the wash mechanism 130, which is comprised of a looping copper manifold 131 with fixed high pressure wash nozzles 132 (FIGS. 2, 8) to directly wash the stage I filter 120. In one example, the continuously running fogger assembly 110, when powered by a constant high pressurization mechanism, is configured to spray monodisperse fog droplets (as opposed to a mist), and is positioned at the inlet 104 of the system 100. In another example system as described in more detail hereafter, the fogger assembly 110 receives cold feed water sourced from typical building water pressures (about 30-60 psig) to generate mist droplets having a diameter of 100 micrometers or less to reduce the temperature of the incoming waste airstream. With either the sourced mechanical/electrical pressurized fog droplets, or through the mist developed from typical building pressures, the created fog or mist droplets serve that a mixed with the incoming waste airstream act to reduce the temperature thereof. This results in condensation of some of the gas phase pollutants (VOCs and sVOCs) contained in the waste airstream and their subsequent collection onto the stage I filter 120. One reason for generating fog instead of mist is to achieve maximal evaporative cooling and VOC condensation. Additionally, a small surplus of water, present on the stage I filter 120 as a thin film due to those of the fog or mist droplets which have not evaporated before contacting the stage I filter 120, is used to effect removal, by solubilization and subsequent drainage, of any soluble and polar particle and gas phase pollutants contained in the waste airstream.

Ozone oxidation is commenced with the introduction of ozone into the housing 102, either by introducing dissolved ozone into the fog droplets, the ozone released upon their evaporation, or by directly injecting gaseous ozone. Advanced oxidation processes (AOP) are activated by modifying the cold feed water fed to the fogger assembly 110. These AOP serve to decompose the susceptible target compounds in the waste airstream. Gaseous ozone can be activated to AOP by a photocatalytic oxidation (PCO) filter with included ultraviolet lamps, which would follow the stage III filter in the system.

Referring again to FIG. 1, the housing 102 encloses a series of filters between the inlet 104 and an outlet 170, at which an exhaust fan 180 creates an airflow path to discharge the commercial cooking exhaust (waste airstream) emitted from the commercial kitchen cooking ventilation hood to the outside atmosphere. The pollution control system 100 would be installed downstream of a commercial kitchen cooking ventilation hood (not shown for purposes of clarity).

The airflow contaminated with cooking emissions (i.e., waste airstream, shown by arrows in FIG. 1) may be subject to the fogger assembly 110 at the inlet 104, in which nozzles 112 spray (under mechanical/electrical pressure means) a plurality of monodisperse, fog (minute water) droplets having a diameter of 20 micrometers or less into the incoming airflow, via the action of the pump 145 drawing from the cold water source. In one example, the size of the fog droplets may be a 1 micrometer mean value diameter. The monodisperse fog droplets mix with the air and evaporate to maximally reduce the waste airstream temperature. For fog, the reduction in temperature of the waste airstream can be 40 degrees F. or more. This in turn results in greater numbers of particulates being collected in all of the stages of the downstream filters 120, 140, 150. The effects of fogger assembly 110 will be explained in further detail hereafter. As to be discussed in detail later below, where the system employs typical building pressures to generate the water droplets (i.e., without a mechanical or electrical pump), the fogger assembly 110 is adapted to generate mist droplets (of <100 micrometer mean value diameter).

The stage 1 filter 120 in one example may be a washable metal filter which filters out particles down to a size of 1 micrometer on a size-based (tested to ASTM 2519 and published) increasing efficiency. The stage I filter 120 has a reactor core (i.e. the center) which increases mixing of the waste airstream with the fog droplets resulting in optimized mechanical filtering principles to remove particle pollutants (such as grease and smoke) in the waste airstream, and optimized solubilization and removal by drainage into a drain 185 of soluble and polar particle and gas phase pollutants in the waste airstream, and dramatically increases the lifetime of the stage II filter 140 and the stage III filter by catching all the grease in the waste airstream. The entire solubilization process and the acceleration of the AOP (which are initialized as soon as the dissolved activated AOP ozone contacts the waste airstream) all take place within the reactor core (i.e., the interior) of the stage I filter 120 where the mixing is maximized. Any particle and gas phase pollutants (i.e., particulate matter, semivolatile and volatile organic compounds (sVOCs and VOCs)) that have not been removed from the waste airstream by the stage I filter 120 continue on into second annular space 125 to be filtered out by the stage II filter 140. The system 100 has slanted drain pans 103 both before and after the stage I filter 120 for proper drainage into the drain 185.

The stage II filter 140 removes particulate matter at a second smaller particulate cut size than the stage I filter 120. The stage II filter 140 can be comprised as a rigid type filter resistant to water vapor or a bag-type filter. Both filter types are rated MERV 15 in accordance with ASHRAE standard 52.2. Both filter types are proprietary with regards to their construction, moisture resistance, low pressure drop, and/or the stitching of a natural fiber material (such as wool) to a synthetic filter media which serves to both remove some VOCs as well as lengthen the life of the synthetic filter media. The airflow and any particles (including the condensed particle pollutants resulting from condensing a portion of the gas phase pollutants in the waste airstream via the fogging process), and gas phase pollutants such as sVOCs and VOCs not removed from the waste airstream by the stage II filter 140 continue on into second annular space 135 to be filtered out by a stage III filter 150.

The stage III filter 150 is configured to remove submicron particles remaining in the waste airstream after passing through the stage II filter 140, including any condensed particle pollutants. The stage III filter 150 is constructed of a proprietary oil mist media which is rated at a 99 DOP efficiency (removes up to 99% of 0.3 micrometer-sized particulates) but results in a performance that is substantially at the level of a HEPA filter (99.97% removal of 0.3 micrometer-sized particles). However, this stage III filter 150 has a longer lifetime and costs significantly less than a HEPA filter.

Instead of the oil mist media, the stage III filter 150 may alternatively include a high efficiency (>95 DOP) media adapted to remove sub-micron particle pollutants remaining in the waste airstream after passing through the stage II filter 140. For example, the stage III filter 150 this may be embodied as a proprietary media consisting of nanofibers and/or an ozone-resistant glass (fiberglass) that enable it to achieve a HEPA filter efficiency performance at conventional 95 DOP pressure drop losses. This fiberglass media resistant to degradation by ozone and Advanced Oxidation Processes (AOP).

A further alternative for system 100 is to formulate the stage II wool/synthetic filter 140 with a synthetic nanofiber material that imparts an overall efficiency of 95 DOP to the stage II filter 140. In effect, this eliminates the need for the stage III filter 150.

The airflow with any remaining submicron particulate matter and sVOCs and VOCs that has not been removed by the stage III filter 150 continue on into third annular space 155 to either be exhausted at outlet 170, or to be optionally filtered out by a stage IV filter 160 (filter bank(s)). Filter banks(s) in the stage IV filter 160 remove, by absorption, any remaining condensed particle pollutants and the gas phase pollutants. The stage IV filter 160 is included in system 100 if AOP is employed in the system 100, so as to remove any remaining unreacted ozone in the system (i.e., where VOC adsorption is required but atmospheric release of ozone is a concern).

The optional stage IV filter 160 (shown in dotted line to denote optional) is configured to remove, by adsorption, sub-micron particle and gas phase pollutants remaining in the waste airstream after passing through the stage III filter 150. The optional stage IV filter 160 may be a one or two pass filter system. The sorbents of the stage IV filter may be comprised of a proprietary sorbent, an activated charcoal sorbent, or a blend of the proprietary sorbent and activated charcoal. Each of these sorbents will be discussed in further detail hereafter.

An alternative applicable to some of the example embodiments explained in more detail hereafter for the stage IV focused filtration of VOCs is to incorporate the aforementioned PCO filter, which incorporates UV-C lamps and a titanium dioxide catalyst to remove, by oxidation, submicron particle and gas phase pollutants remaining in the waste airstream after passing through the stage III filter 150. This alternative stage IV filter also can be designed to quench excess ozone and thus eliminate the need for a sorbent stage.

Referring again to FIG. 1, during normal commercial cooking operations, the hot exhaust collected in the commercial kitchen cooking ventilation hood is ducted and drawn into the inlet 104 of system 100 by a UL 762 kitchen grease exhaust fan 180. The contaminated or waste airstream passes over stage I (120), stage II (140) and stage III (150) filters in sequence, and if included, a stage IV filter (160) consisting of one or two passes (one or two filter banks) of sorbent filters. Each filter in the first three filter stages I-III removes a size-dependent fraction of the particulate component of the exhaust (the other component in the waste airstream being gaseous, which would be removed by solubilization in the stage I filter, adsorption in the wool of the stage II filter and adsorption by the stage IV sorbent). All of the captured emissions are subject to decomposition via the AOP oxidation process. All particle removal efficiencies are described as MERV or DOP ratings according to ASTMF 2519, ASHRAE 52.2 or Military standard 282 respectively. For system 100, the respective efficiency ratings are as follows:

1. STAGE I—EFFICIENCY 58%@ 3 μm and 92% @ 5 μm (ASTM F 2519)
2. STAGE II—MERV 15 (ASHRAE 52.2) with an optional natural fiber layer stitched on
3. STAGE III—(95-99) DOP (Military standard 282)-HEPA 99.97

After the cooking operations cease, the wash operation begins. The wash operation is performed to remove the grease accumulated on the stage I filter 120. The wash operation consists of opening wash and detergent solenoids by the wash control system (WCS) 195 and activating the detergent pump 175, also done from the WCS 195. As shown in FIG. 1, hot water with a specially formulated detergent 177 is pumped into the wash mechanism 130. The distance from the washing surface is carefully calculated to effect full coverage of the four square foot (2'×2') filter area of the stage I filter 120. The detergent 177 is allowed to soak and emulsify the accumulated grease on the filter 120 surface, after which a rinse cycle is commenced. Next, a five minute drip dry cycle is commenced. The system 100 has slanted drain pans 103 both before and after the stage I filter 120 for proper drainage into a drain 185. This wash and rinse cycle is then repeated. After these first two cycles are completed, the exhaust fan 180 is activated for one hour to dry the stage I filter 120.

Figure 2:
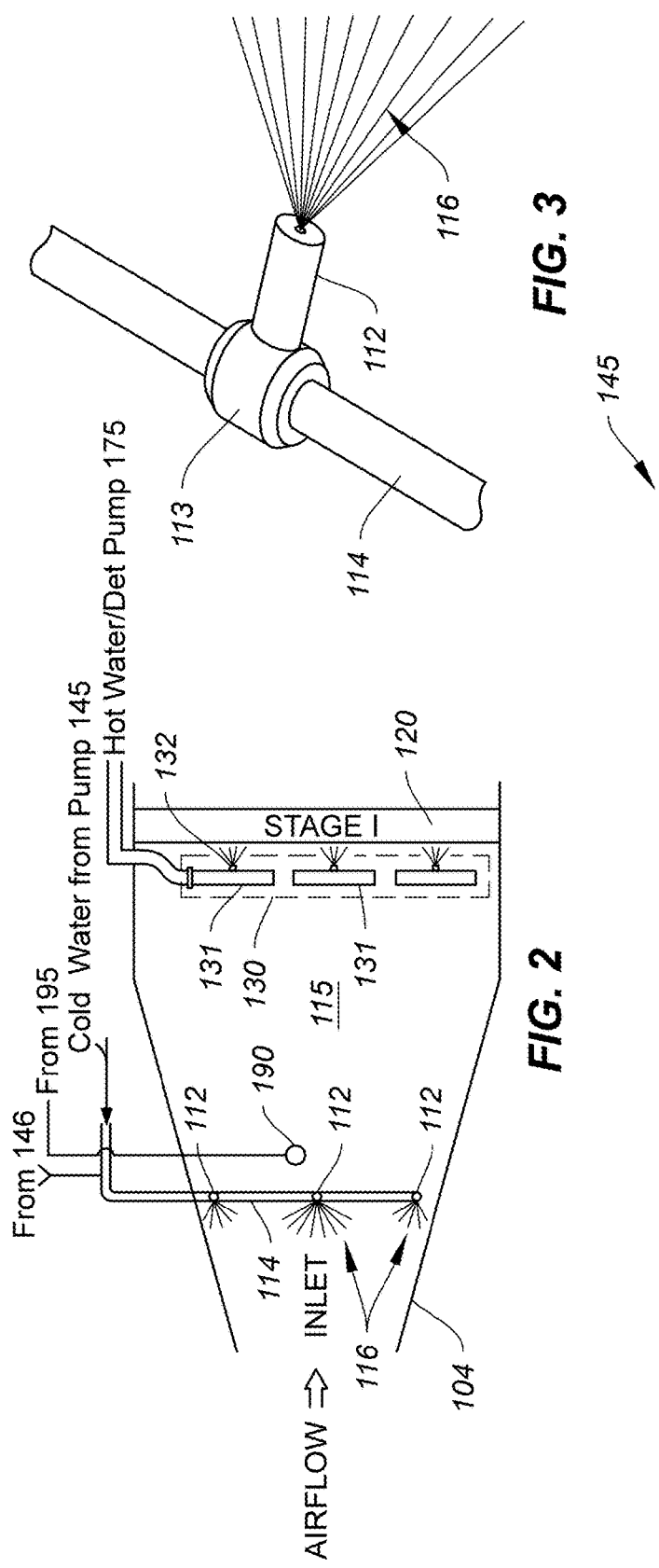
FIG. 2 is a front portion view of part of the pollution control system to show a fogger assembly in more detail.
Figure 3:
FIG. 3 is a plan view of an example high pressure nozzle installed on a collar that is positioned on a stainless steel tube according to the example embodiment.
Figure 4:
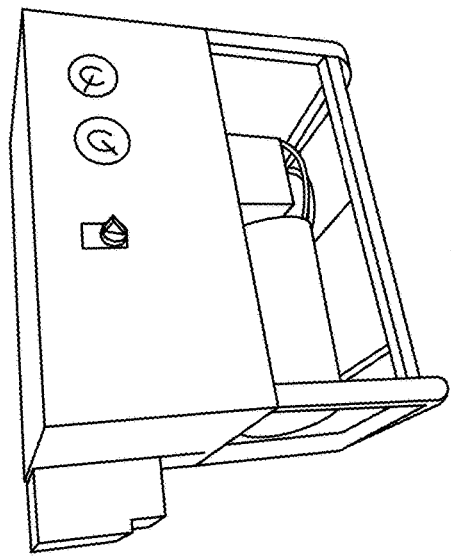
FIG. 4 is a picture of a pump used for the fogger assembly according to the example embodiment.

FIG. 2 is a front portion view of part of the pollution control system to show a fogger assembly in more detail; FIG. 3 is a plan view of an example high pressure nozzle installed on a collar that is positioned on a stainless steel tube according to the example embodiment; and FIG. 4 is a picture of a powered pump used for the fogger assembly 110 according to the example embodiment. Referring to FIGS. 2-4, the fogger assembly 110 utilizes the process of injecting a fine fog of monodisperse, equal-sized 1 micrometer aerosols (e.g., droplets) to effect evaporative cooling of the exhaust airstream. With this sized droplet, a maximal cooling of the waste airstream at the inlet 104 can occur. The temperature drop depends on the psychometric parameters of the airstream. Through this process of subjecting the incoming waste airstream emitted from the kitchen ventilation hood to the fog droplets sprayed therein from fogger assembly 110, three objectives may be achieved. First, there is maximal cooling of the waste airstream so as to condense out susceptible VOCs and sVOCs (gas phase pollutants) that have boiling points that are above the newly lowered psychometric airstream temperature due to the fog droplets evaporating in and cooling the waste airstream.

These compounds condense into the solid phase and are subsequently removed by filtration. Second, by increasing the number of particles as described above, the particle sizes are grown through agglomeration and hence can be removed earlier and/or more easily cleaned by the stage I filter 120 and stage II filters 140. Third, by having an excess of fog droplets and a thin film of water on the surface of the stage I filter 120, the excess water resulting from those fog droplets which do not evaporate before contacting the stage I filter 120, this can effect solubilization of the highly and moderately polar compounds (i.e. polar particle and gas phase pollutants dissolvable in water) found in the emission profile, which are removed from system 100 via the drain 185.

Accordingly, the fogger assembly 110 sprays a fog of monodisperse droplets to mix with the incoming waste airstream so as to achieve psychrometric saturation of the waste airstream, evaporative cooling of the airstream, and condensation of susceptible gas phase pollutants in the airstream (those gas phase pollutants having boiling points above the new lower temperature of the cooled waste airstream) into condensed particle pollutants that may be easily removed by the filters (stages I through IV).

To incorporate this technology, during standard filtering for cooking operations (i.e., during non-wash times), the fogger assembly 110 makes use of a high pressure pump 145 and a fog nozzle 112 configuration that generates a fog of equal-sized 1 micrometer fog droplets to exploit the physico-chemical properties of condensation and solubility to increase the total mass of emissions removed from the airstream by the stage I filter 120. The number of fog nozzles 112 utilized is calculated using psychometric principals and is specific to the cooking processes occurring under the kitchen hood and associated duct temperature.

The equipment includes a plurality of high-pressure fog nozzles 112 and a fogger pump 145, which may be a MICROCOOL™ pump for example. Three nozzles 112 are distributed vertically on each side of the air inlet 104 through vertical stainless steel tubing 114 and the MicroCool Rapid Orientation Collar (ROC) mounting system, which employs special collars 113 that slips over the tubing 114 and includes sealing rings that make a pressure tight seal against the outer wall of the tubing 114, permitting the nozzle 112 to be rotated thereon at any desired angle. Each nozzle 112 can be closed with an integral closure screw if necessary for psychometric reasons.

The vertical stainless steel tubing 114 is joined at the top of the inlet 104 outside of the housing 102 and then connected by additional stainless steel tubing to the fogger pump 145, which draws on the cold water source. The nozzles 112 are pointed so that their spray pattern 116 is directed into the incoming contaminated cooking exhaust air. A distance of four feet within housing 102 between the fogger assembly 110 and stage I filter 120 is utilized to effectively slow down the air and ensure that the fog droplets are evaporating and the waste airstream is reaching water vapor saturation and maximum evaporative cooling.

The fogger pump 145 is activated by a signal from the WCS 195 control panel and the cold water solenoid is opened from WCS 195. The function of the pump 145 is to maintain 1000 psi water pressure to the nozzles 112 by incorporating a variable frequency drive and pressure feedback loops. The droplet size of droplets in the fog is maintained at a consistent 1 micrometer size.

The frame on which the fogger pump 145 is mounted can accommodate up to two inline (in series) devices: a pH boosting device (shown as element 147 in FIG. 1) to boost the pH of the cold water source, and a diamond crystal ozone filter cartridge (shown as element 149 in FIG. 1) for generating dissolved ozone, to be discussed hereafter. The devices 147 and 149 thus comprise an Advanced Oxidation Process (AOP) dissolved gas generator 146. A provision is made for an inclusive reverse osmosis system for trouble-free nozzle longevity when AOP are incorporated into the system. As an alternative to boosting pH, dissolved ozone may be converted to AOP by injection of hydrogen peroxide in the cold feed water.

Standard ozone may be introduced into the housing 102 of system 100 either by dissolving it into the pressurized fog water, or by directly injecting as ozone gas from an ozone gas generator 196 into the inlet 104 via an ozone gas injection device, shown in FIG. 1 as an ozone wand 190, for example. Either way, upon contact of the ozone with the waste airstream within system 100, oxidative destruction/decomposition of most of the organic compounds found in the cooking emissions (i.e., waste airstream) commences. The reactivity of various organic compounds to undergo oxidation is well studied and reaction rates and orders well known. These susceptible compounds may be individual compounds that are in the waste airstream, absorbed or adsorbed on particles that have been captured on the stage I and II filters 120 and 140, or adsorbed onto the wool in the stage II filter 140 or sorbent filter bank(s) comprising the stage IV filter 160 (the latter filter is used where atmospheric dumping of fugitive or unused ozone in system 100 is a concern).

The use of Advanced Oxidation Processes (AOP) is an ideal approach to treat persistent water or air contaminants. AOP can be understood as the combination of two or more processes to generate or increase the number of hydroxyl radicals (.OH). The hydroxyl radicals contribute to the oxidation of undesirable substances and have a considerably higher oxidation potential compared to other oxidants.

Once the fog droplets are evaporated the hydroxyl radicals and the activated ozone immediately react to decompose all susceptible oxidizable substances. The high degradation performance and the quick reaction kinetics of this process are the formula for success when it comes to eliminating numerous persistent substances.

Hydroxyl radicals are the foundational component of AOP. AOP are initiated upon contact of activated ozone with the waste airstream so as to decompose particle and gas phase pollutants within the waste airstream in the air as well as in all of the filter stages I through IV. It is thus offered as an option for maximal odor control and filter life within system 100. It is offered as an option for both wash (with wash mechanism 130) and non-wash pollution control systems. For the system 100 with wash mechanism 130, it may be injected into the inlet 104 of the system 100 in one of two ways: namely as dissolved activated ozone for AOP via the AOP dissolved gas generator 146 (comprising pH booster device 147, and the diamond crystal ozone cartridge 149 that generates the activated ozone (comprised of ozone gas with a surplus of hydroxyl radicals (.OH)) into the cold water source on its path to the fogging nozzles 112 of fogger assembly 110; or by activation of gaseous ozone by UV-C light or PCO or both.

In another configuration for ozone injection with the fogging assembly 110, such may be accomplished by installing the AOP dissolved gas generator 146, which comprises the pair of inline devices 147 and 149 as previously discussed, into the incoming cold water line. The pH booster 147 is designed to raise the pH of the filtered cold water source by adding NaOH into the water, which increases the amount of OH ions in the water for subsequent generation of hydroxyl radicals for AOP, so that a maximum amount of hydroxyl radicals (.OH) can be formed for the AOP. The ozone cartridge 149 may be embodied as a Solid Synthetic Diamond Electrode cartridge and is provided to generate dissolved ozone gas to mix with the surplus hydroxyl radicals within the water so as to activate the dissolved ozone within the water. Upon evaporation during the evaporative cooling process (due to the fog droplets released by the nozzles 112 of the fogger assembly 110), the activated ozone is released to initiate AOP, which generate oxidation of the organic compounds in the mixed air/fog waste stream and in all stages of the filters.

For non-wash systems (i.e., systems without a wash mechanism 130), ozone can be injected in gas form via the ozone gas generator 196 to the ozone wand 190. As to be seen below in other example embodiments, ozone gas may be generated in-situ by the UV-C lamp component of a stage IV filter embodied as the aforementioned PCO filter. That PCO filter is also configured so as to activate any ozone present to AOP for stages downstream of the PCO filter.

Figure 5:
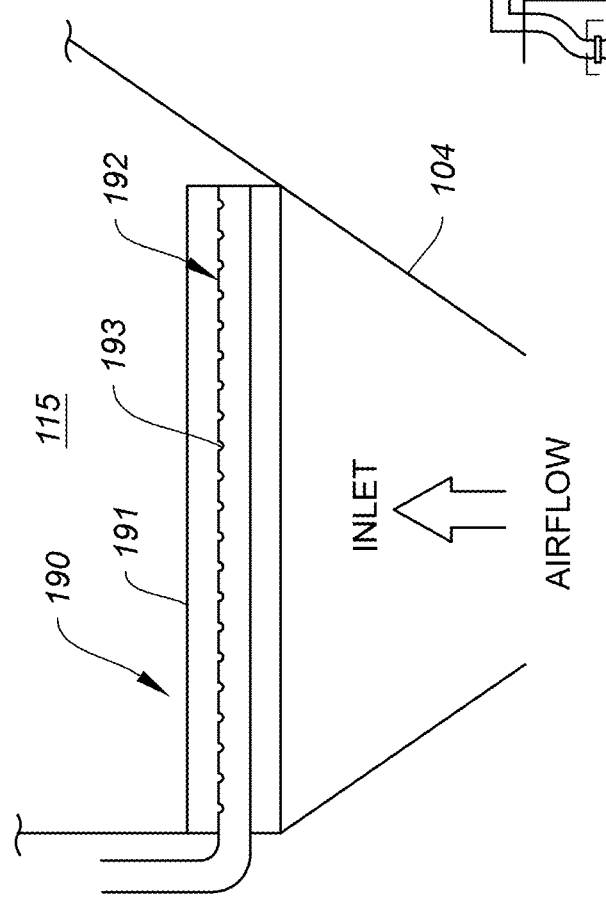
FIG. 5 is a front view of an ozone gas injection device according to an example embodiment.
Figure 6:
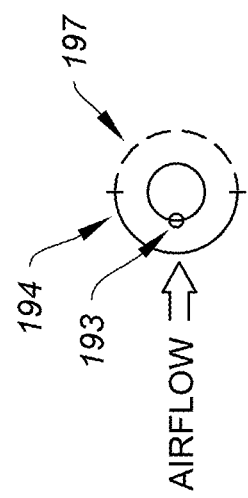
FIG. 6 is an end view of the ozone gas injection device of FIG. 5.

FIG. 5 is a front view of an ozone injection device according to an example embodiment; FIG. 6 is an end view of the ozone injection device of FIG. 5. System 100 is provided with an optional ozone injection device in the form of ozone wand 190. Wand 190 is configured to receive a source of ozone directly from an external source of ozone, for example, the ozone gas generator 196. In an alternative embodiment, another or second ozone injection device could be placed after the stage III filter 150; this is identified by injection point 191 in FIG. 1.

Referring to FIGS. 5 and 6, wand 190 is a double walled stainless steel tube that spans the inlet 104 to system 100 and consist of a "blind" solid metal half 194 that faces the dirty air and a perforated "open half" 197 that allows the ozone to leave the annular space 115 and enter the airstream. The inner tube 192, also made of stainless steel is a solid tube with a series of increasing hole diameters 193 designed to distribute the ozone evenly along the length of the tube and also to assure that the pressure ozone exceeds that of the ductwork static pressure at the inlet 104 of system 100. The weight of ozone delivered is calibrated based on the ozone gas generator 196 output and the distribution pressure in the inner tube 192 and external to it in the inlet 104. It is assumed that all ozone that leaves the inner tube 192 effectively enters the airstream through the outer half 194 blind tube.

The wash control system (WCS) 195 has many functions. As examples, some of the functions of the WCS 195 include, but are not limited to:
1) Start and stop the exhaust fan 180 (and remote supply fan if applicable);
2) Respond to a fire alarm condition by releasing fire suppression chemical and if desired, water into the system 100, shutting off remote supply fan and activating (if not already on) the exhaust fan 180;
3) Control the wash cycle by activating the hot water solenoid, detergent pump 175, and exhaust fan 180 in accordance with the wash cycles described below:
   a. 2 minute fan shutdown,
   b. 30 second pre wash hot water warm up,
   c. 2 minute wash with detergent,
   d. 1 minute rinse,
   e. 5 minute drip dry and drain,
   f. Repeat step c thru e, and
   g. 60 minute forced air dry;
4) Signal to activate the fogger assembly 110 solenoid and fogger pump 145, if included as an option; and
5) Signal to energize the ozone filter cartridge 149 of AOP dissolved gas generator 146, if included as an option.

Figure 7:
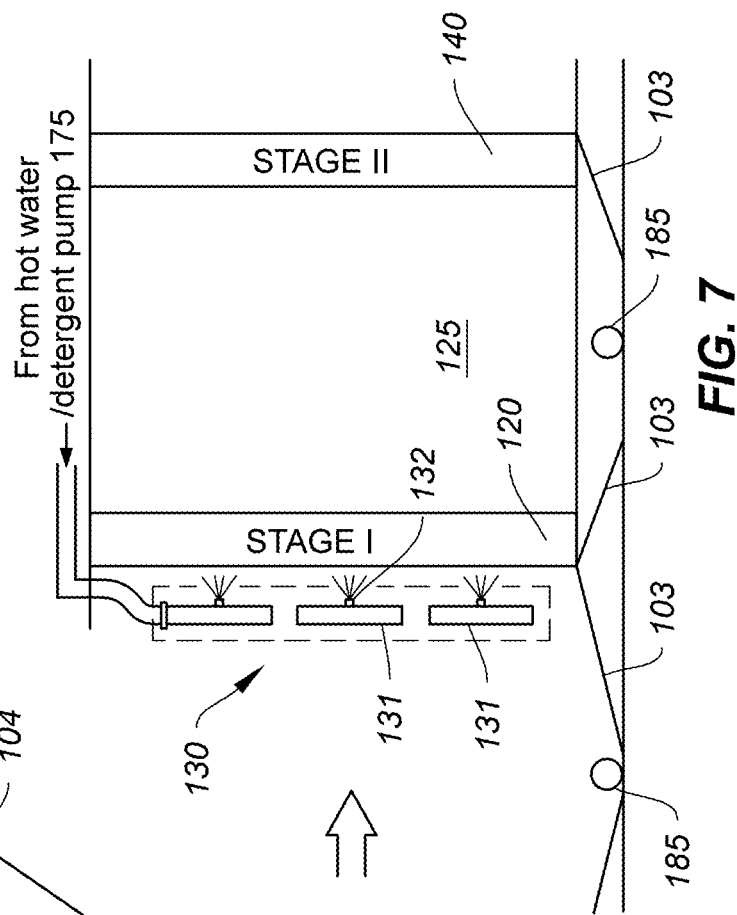
FIG. 7 is a partial side view of the first and second stage filters to illustrate the wash mechanism in greater detail.
Figure 8:
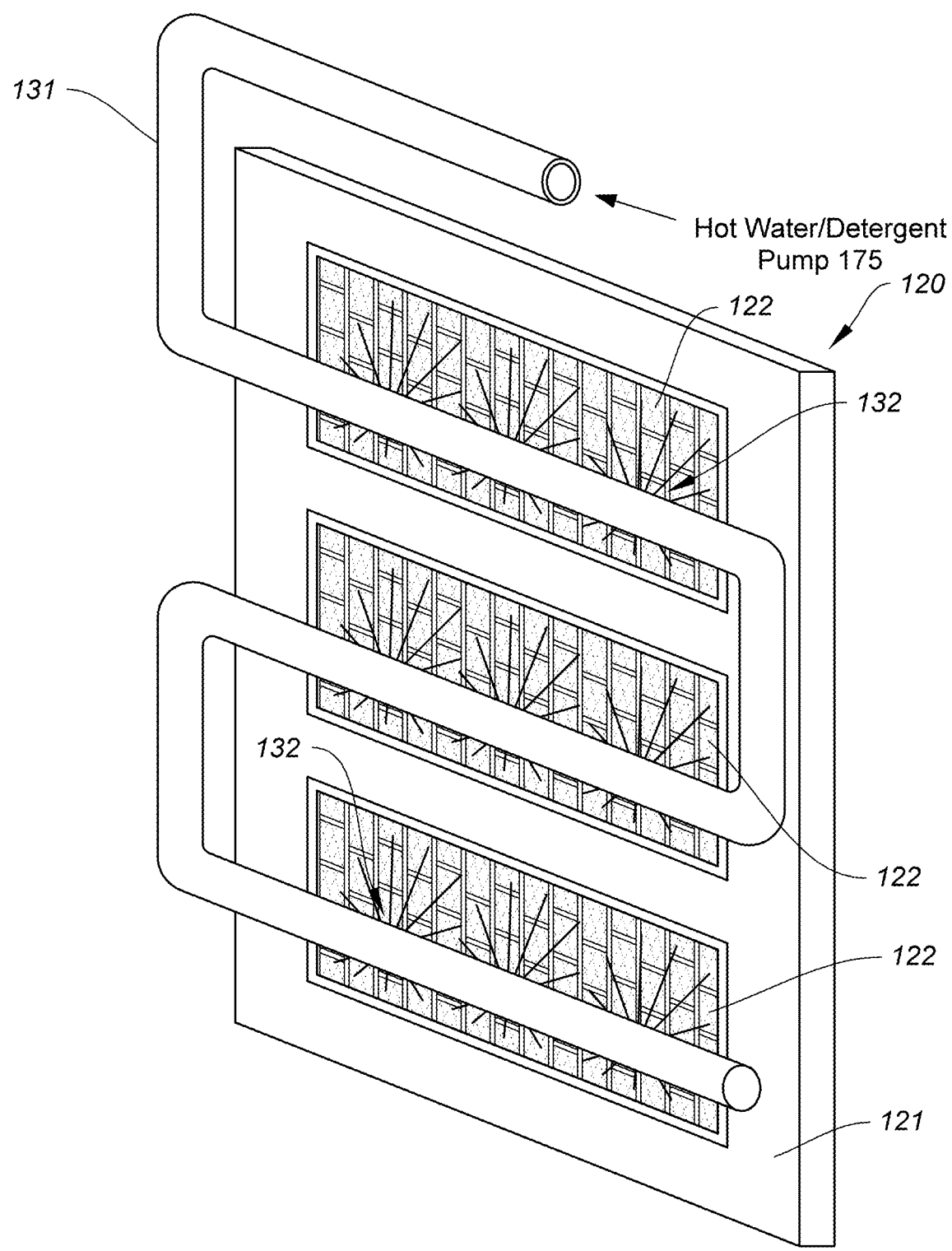
FIG. 8 is a perspective view of the looping manifold and nozzles of the wash mechanism in relation to the first stage filter.

FIG. 7 is a partial side view of the first and second stage filters to illustrate the wash mechanism in greater detail; FIG. 8 is a perspective view of the looping manifold and nozzles of the wash mechanism in relation to the first stage filter. Referring to FIGS. 7 and 8, the wash mechanism 130 is comprised of a looping copper manifold 131 which includes a plurality of fixed nozzles 132. Nozzles 132 are full conical high pressure spray nozzles As best shown in FIG. 8, the stage I filter 120 may comprise a metal frame 121 which retains a plurality of stacked filter coil pack reactors 122 ("coil packs") therein. Three coil packs 122 are shown in FIG. 8, although two may be sufficient depending upon CFM requirements. The "s" or serpentine shape of the manifold 131 provides three nozzle rows, each row containing a set of three equally-spaced nozzles 132 to spray a mixture of hot water and detergent 177 (via detergent pump 175) onto the surface of each of the three coil packs 122 of filter 120. This nozzle configuration is only exemplary; different combinations of nozzles 132 may be used so long as the water-detergent spray is evenly distributed on the surfaces of the coil packs 122. As previously noted, the distance of the wash mechanism 130 from the washing surfaces of the stage I filter 120 is carefully calculated to effect full coverage of the four square foot (2'×2') filter area of the stage I filter 120.

Figure 10:
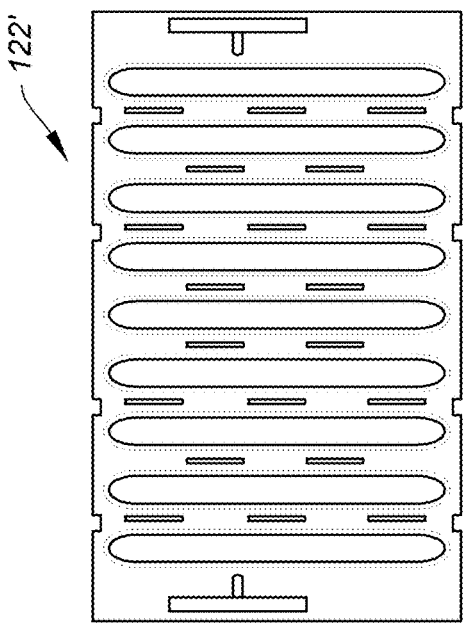
FIG. 10 is another style of stage I filter according to an example embodiment.
Figure 9:
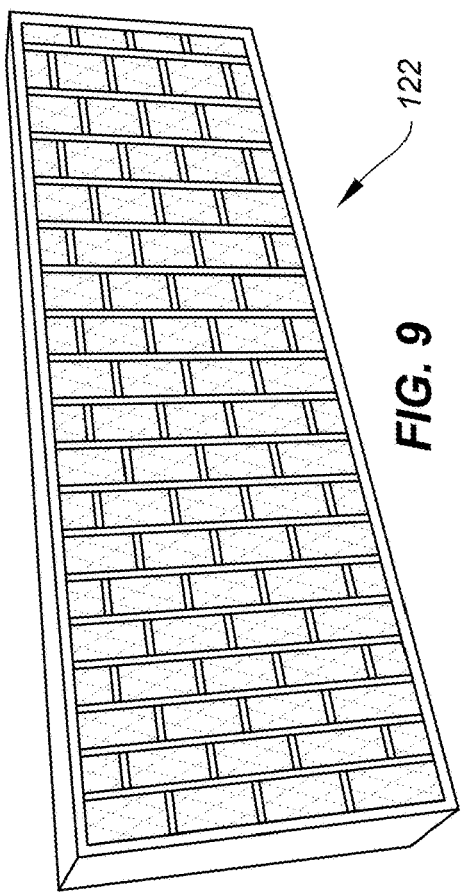
FIG. 9 is an example coil pack used in a stage I filter according to an example embodiment.

FIG. 9 is an example coil pack reactor used in one type of a stage I filter according to an example embodiment. FIG. 10 is another and different style of stage I filter called the Cascade Filter with the reactor being the space within the filter and the air directed there by small slots. Both filters are nominally two inches thick and fit into a 2 inch filter track with weep holes to allow the removed grease to drain to the sump.

The first example filter for use as the stage I filter 120 is the VERITECH® filter, with its plurality of stainless-steel coil packs 122 (2 or 3 coil packs depending on the air volume). The Veritech filter is a stainless steel coil pack filter which has a higher collection efficiency (a 60% removal for particle size 3 microns) than an alternative stage I filter type referred to as the CASCADE™ filter, and a greater surface area for solubility interaction. The coil pack 122 is shown in FIG. 9 and several of these coil packs (two or three coil packs in vertical relation, depending on the CFM requirement) are stacked in a typical installation into a metal filter frame 121 (FIG. 8) to be installed as a stage I (24"×24"×2") filter 120. The reactor (i.e., interior) within the coil packs 122 of the Veritech filter is where the extensive mixing and solubilization of the polar compounds found in the waste airstream occurs entirely and where the advanced oxidation processes (AOP) are accelerated via extensive mixing, and where the final degree of the condensation takes place as well. Accordingly, the use of a Veritech filter as the stage I filter 120 is desirable so that, maximum solubilization, maximum chance of oxidation of compounds, and maximum temperature drop in the waste airstream can occur, (i.e., mixing within the reactors of the coil packs 122 to enhance, solubility, oxidation and evaporative cooling).

The Veritech filter coil pack is disclosed and described in EP0857508 to Van Nierkirk, published Aug. 12, 1998 (filed Oct. 2, 1998) and entitled "Separation Apparatus", the entire contents of which are hereby incorporated by reference herein. An alternative filter for stage I is built off the coil pack 122' shown in FIG. 10, which is offered by FRANKE® as the aforementioned Cascade grease filter. This filter has a 50% removal efficiency for particle size 5 micrometers. The Franke Cascade grease filter coil pack is disclosed and described in U.S. Patent Appl. Pub. No. 20120247074 to Chmayssani et al., published Oct. 4, 2012 (filed Mar. 29, 2012) and entitled "Double Helix Grease Filter", the entire contents of which are hereby incorporated by reference herein.

Figure 12:
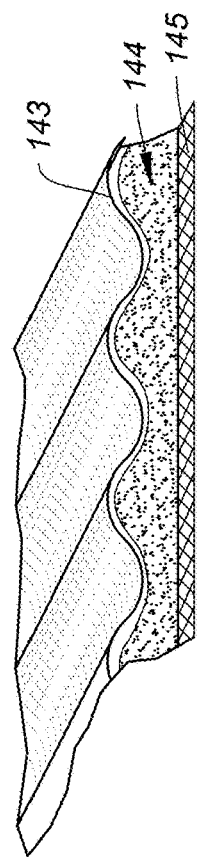
FIG. 12 shows a cross-section of the stage II filter of FIG. 11 to illustrate material components thereof.
Figure 11:
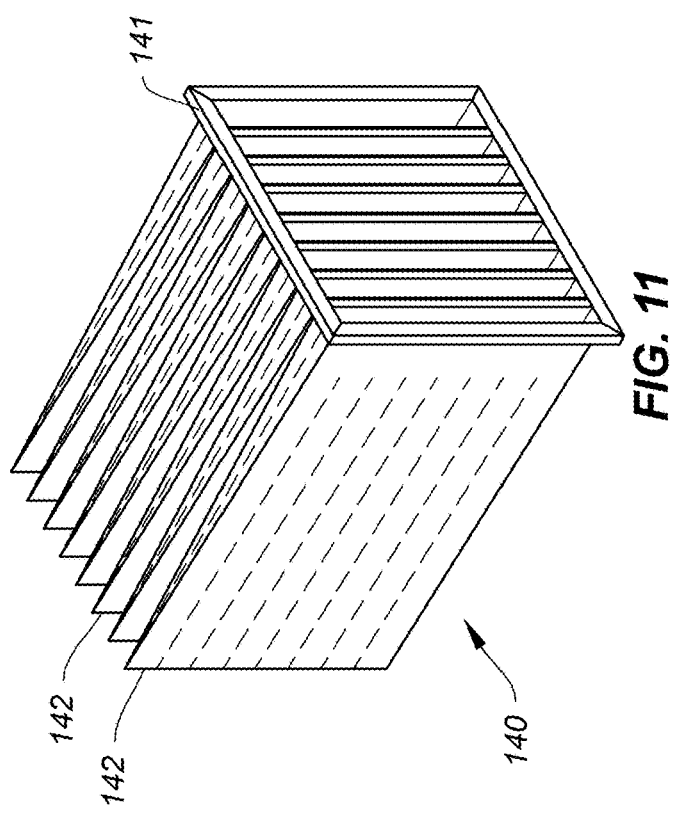
FIG. 11 is a perspective view of a stage II filter according to an example embodiment.

FIG. 11 is a partial front view of a stage II filter according to an example embodiment, and FIG. 12 is a cross-section of the stage II filter of FIG. 11 showing material components thereof. Referring to FIGS. 11 and 12, the stage II filter 140 is provided by Safe Air Service, LLC. Stage II filter 140 has a one-inch header 141 and a filter bag body designed as a plurality of pockets 142. Specifically, the stage II filter 140 consists of a double layer stitched media bag filter with a one inch header. FIG. 12 shows the material used to make the filter 140 of FIG. 11. The material includes a natural fiber which in one example is a proprietary wool layer 143, which is attached (such as by stitching, heat sealing and/or adhesives) onto a MERV 15 synthetic media 144, which in turn is attached to material which forms the outer surface 145 of the filter 140. Wool is a hydrophilic in nature and this facilitates gas (VOC) removal by adsorption.

A natural fiber such as wool also serves to wick any accumulated grease particles that have passed through the stage I filter 120 away from the MERV 15 synthetic media 144 so as to significantly enhance the stage II filter 140's replacement lifetime. Accordingly, incorporation of a wool layer 143 on top of the MERV 15 synthetic media 144 in the stage II filter 140 allows the filter 140 to now remove and retain a portion of the gases (VOCs) therein. A further possible configuration for the stage II filter 140 is a customized MERV 15 box filter. This box filter is designed for a smaller unit and features a very low pressure drop as well as a high resistance to moisture.

FIG. 13 is a perspective front view of a stage III filter according to one example embodiment, and FIG. 14 is a cross-section of the stage III filter internals of FIG. 13. Referring to FIGS. 13 and 14, the fiber cross-section of the stage III filter 150 includes a high-impact plastic frame 151, a bead separator 152 and synthetic media 153, which is an oil-mist media. This provides an embossed oil mist media with adhesive bead separators, known as an "E-Pleat" technology pleat pack which is generally water resistant. The stage III filter 150 is unique in that it does not allow water to penetrate the filter and thus could be washed in another embodiment of the system 100. This stage III filter 150 is disclosed and described in FIGS. 33-34 of U.S. Pat. Appl. Pub. No. 20120317940 to Ball et al., published Dec. 20, 2012 (filed May 24, 2012) and entitled "Non V-Bank Filter For Animal Confinement Facility", the entire contents of the application being incorporated by reference herein. The stage III filter 150 is constructed with a specialized oil mist media. This unique filter media was screened and tested under the South Coast Air Quality Management District (SCAQMD) PAR 1138 testing protocol and demonstrated to be as efficient as a comparative HEPA filter under real world char broiling of 20% fat hamburgers. The stage III filter 150 with oil-mist media has a 99 DOP rating. Due to the natural attraction of the oil-mist media to the oily composition of the bulk of the cooking emissions; this filter removes approximately the same amount of particulate as a glass HEPA filter rated at 99.97%.

The stage IV filter 160 (filter bank(s)) is configured to remove, by adsorption, any condensed particle and gas phase pollutants remaining in the waste airstream after passing through the stage III filter 150. The stage IV filter 160 (filter bank(s)) is used when VOC adsorption is required (and mandated when ozone is injected into the system 100, which needs to be quenched prior to exiting outlet 170 to the atmosphere) and may be either 2-inch flat panels arranged in a "V" configuration" or arranged in V-shaped cassettes, or, when a double pass configuration is chosen, the flat panels and the cassettes. The weight range for either of these is 12-25 pounds for service convenience. One sorbent material to be used in these filter bank(s) may be composed of a new proprietary sorbent called TECHZORB-RH™. TechZorb-RH is a hydrophobic synthetic zeolite which is specifically compounded to function well in high humidity environments (such as a fog environment), and removes VOCs by adsorption in the high relative humidity environment. In an example (within a fog environment) where the stage IV filter 160 is configured as a two pass system, the first pass filter may include the TechZorb-RH as the sorbent and the second pass filter may include activated charcoal as the sorbent.

A variation of TechZorb has been developed for non-fogging systems (where fogger assembly 110 is not employed). Typically, a stage IV filter 160 in this configuration may be a two-pass configuration (first pass filter including TechZorb as the sorbent, second pass filter having activated charcoal as the sorbent. This TechZorb variation is also a hydrophobic synthetic zeolite, but it is formulated for lower humidity and higher adsorption capacity to catch the fraction of the VOCs that the activated charcoal does not catch (in a non-fog environment).

Two passes of sorbent for the stage IV filter 160 assure greater odor reduction and halves the frequency of replacement, and is recommended for freestanding units, as opposed to self-contained re-circulating units (vent less hoods), as space does not allow this configuration. When a double pass configuration (2 filters in series) of sorbents is used (and recommended to quench any fugitive ozone), a second pass of bonded carbon panels is recommended.

FIG. 15 is a drawing of a recirculating (vent less) kitchen exhaust hood, FIG. 16 is a side view of the drawing of FIG. 15, and FIG. 17 is a block diagram of a pollution control system according to an example embodiment configured for the recirculating (vent less) kitchen exhaust hood of FIGS. 15 and 16. Another application for the removal of cooking emissions involves the use of the same filtration technologies in what is termed a recirculating hood. Here, the exhaust collected over non-gas cooking appliances are run through a series of filters and then discharged back into the kitchen space. One distinct and tremendous advantage of this technology is that the dramatic cooling of the hot exhaust air (by fogger assembly 110) allows the technology to be listed for electric char broilers.

Referring to FIGS. 15 through 17, all of the above described technologies can be implemented in the aforementioned vent less recirculating hood device. These consist of a regular kitchen exhaust hood (FIG. 15) that has a filtration mechanism (FIG. 17) contained in the housing above the hood filters shown in FIGS. 15 and 16 and that discharges the air back into the kitchen space after filtering it. A miniaturized version of the fogger pump 145 has been developed for this application, although not shown for reasons of brevity.

Again, the described technologies lead to reduced filter cost and more efficient filtration through fogging and ozone introduction. Inclusion of one inch activated charcoal sorbent panels as the stage IV filter 160 is mandatory to eliminate fugitive ozone from entering the indoor kitchen space. These recirculating hoods must pass a specific UL 710B standard to certify that they achieve the required particulate emission reduction. Also, these hoods are never used for gas-fired appliances since they represent a risk of carbon monoxide poisoning.

Figure 18:
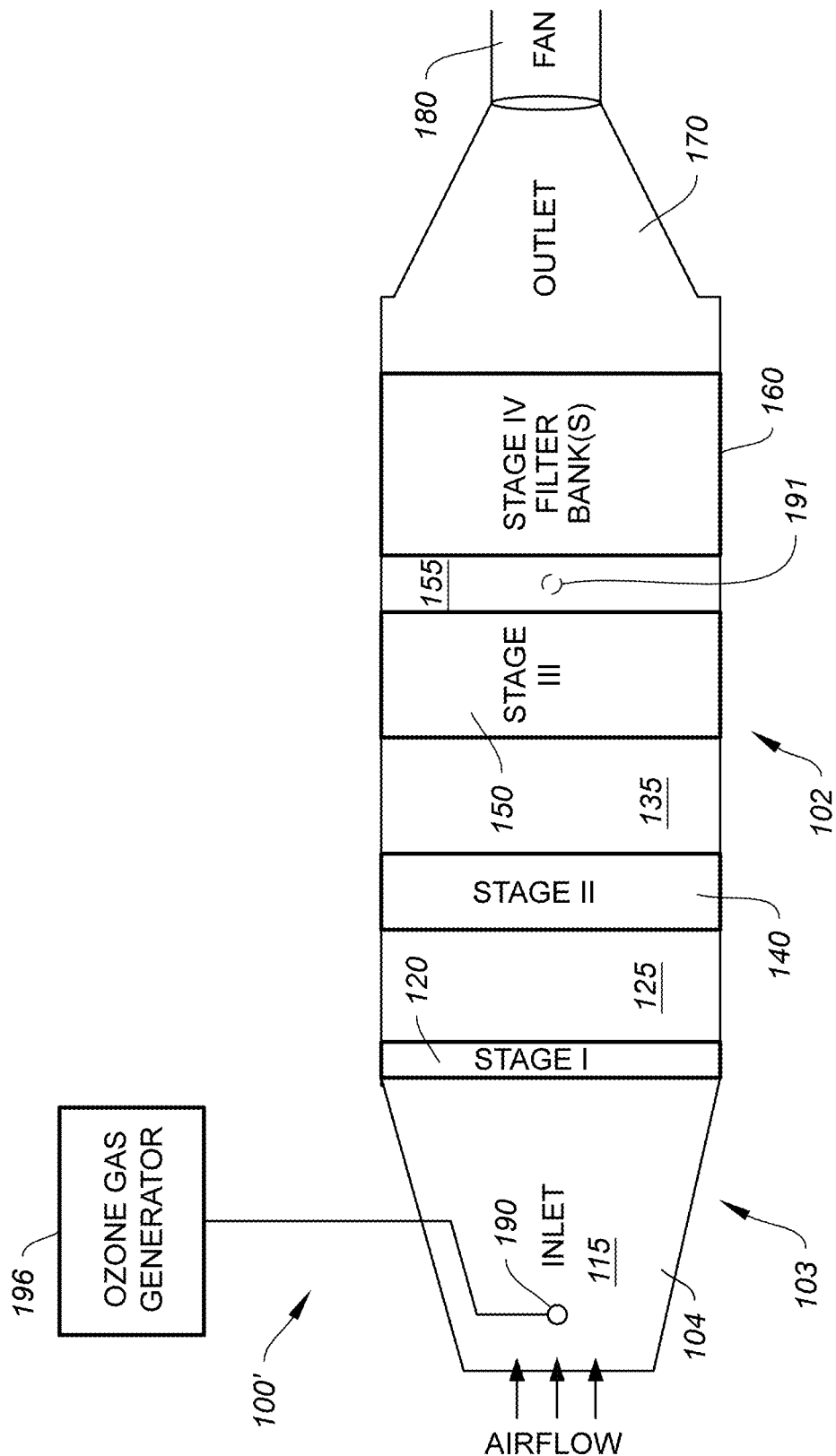
FIG. 18 is a block diagram of a dry, mechanical filter-based pollution control system according to another example embodiment.

FIG. 18 is a block diagram of a mechanical filter-based pollution control system according to another example embodiment. FIG. 18 includes many of the same components as in FIG. 1; thus only the differences are discussed in detail. FIG. 18 illustrates a system 100' without a fogger assembly 110 and without a wash mechanism 130; system 100' may be understood as a "dry" system. As there is no filter washing, the stage I filter 120 may be composed of a less expensive disposable synthetic media for filtering grease and particles in the waste airstream. An example may be a synthetic filter with an efficiency rating of MERV 6-10. The efficiency of the stage I filter 120 is selected so as to approximate the same filter change frequency as that of the stage II filter 140 (so both filters 120, 140 can be replaced at the same time). Another configuration for the stage I filter 120 is as a wool pleated or bag filter, which may be a more sustainable alternative to a synthetic media filter, imparting VOC retention with the lower fire risk properties inherent in wool.

The stage II filter 140 may have the same construction as in FIG. 1, a wool layer attached to a MERV 15 synthetic media for removing particle and gas phase pollutants remaining in the waste airstream after passing through the first stage filter 120. The stage III and IV filters 150, 160 may also be similar as described with respect to FIG. 1, where the stage III filter includes an oil-mist media therein for removing sub-micron particle pollutants remaining in the waste airstream after passing through the stage II filter, and where the stage IV filter 160 removes, by adsorption, sub-micron particle and gas phase pollutants remaining in the waste airstream after passing through the stage III filter 150.

Here, since there is no fogger assembly 110 and wash mechanism 130, the means to inject ozone within the housing 102 to initiate oxidation of organic compound upon contact with the waste airstream, so as to decompose particle and gas phase pollutants of the waste airstream in the first through fourth stage filters, is met by incorporating the ozone gas generator 196 and an ozone injection device such as the ozone wand 190 into system 100. The ozone can also be introduced by appropriate wavelength selection of the UV-C lamps of the PCO filter, in an embodiment of system 100 where the PCO filter serves as the stage IV filter. The PCO filter of system 100, in part or whole, also serves to activate the ozone to AOP.

Accordingly, the pollution control system 100 as heretofore described employs ozone with or without advance oxidation processes (AOPs) to maximize the number of hydroxyl radicals generated, so as to decompose particles trapped in filter stages I-IV, to decompose solubilized VOCs (gas pollutants) through mixing in the stage I filter 120, to decompose adsorbed VOCs trapped in the wool layer 143 of the stage II filter 140, and to decompose any remaining VOCs adsorbed in the stage IV filter 160.

The stage II filter 140 with its wool layer 143 can lengthen the life of the stage IV filter 160 sorbent because some VOCs that normally would reach the stage IV sorbent can actually be adsorbed and held in the wool of the stage II filter 140. This segregation also facilitates greater oxidative destruction of all adsorbed gas phase pollutants via AOPs in both locations because of the lesser density of adsorbed compounds spread through the total volume of media or sorbent (i.e., the volume of wool fibers in the stage II filter 140 and the volume of the sorbent material in the stage IV filter 160)).

Further, the stage III filter 150 enhances oxidative destruction of adsorbed particles because of the greater amount of smaller particles that are retained. Specifically, its oil-mist media increases the efficiency of the filter 150, so as to remove approximately the same amount of particulate as a glass HEPA 99.97 filter, due to the attraction of the oil-mist media to the emission compound (oil). Yet further, a pollution control system 100 including a combination of the fogger assembly 110, stage II filter 140 having the wool/synthetic media material construction, and stage III filter 150 with the oil-mist media substantially reduces filter replacement costs while maximizing emission removal.

The stage IV filter bank(s) 160 of FIG. 18 may be similar to that described with respect to FIG. 1. Namely, the stage IV filter 160 in one example may include a hydrophobic synthetic zeolite sorbent alone or in a blend that is adapted to catch particulate and gas phase pollutants having an internal pore diameter size in a range between about 0.3 to 1.0 nanometers. Alternatively, the stage IV filter 160 may be configured as a two-pass filter system, the first pass filter including a sorbent composed of the hydrophobic synthetic zeolite, and the second pass filter including an activated charcoal sorbent. In yet another alternative, the stage IV filter 160 may be composed of a sorbent comprised of a blend of hydrophobic synthetic zeolite and activated charcoal. Moreover, the stage IV filter 160 configuration with hydrophobic synthetic zeolite achieve $SiO_2:Al_2O_3$ ratios from 20 to 200. This enables the sorbent to effectively remove $C_4$-$C_{10}$ compounds through molecular sieve size capture.

Figure 19:
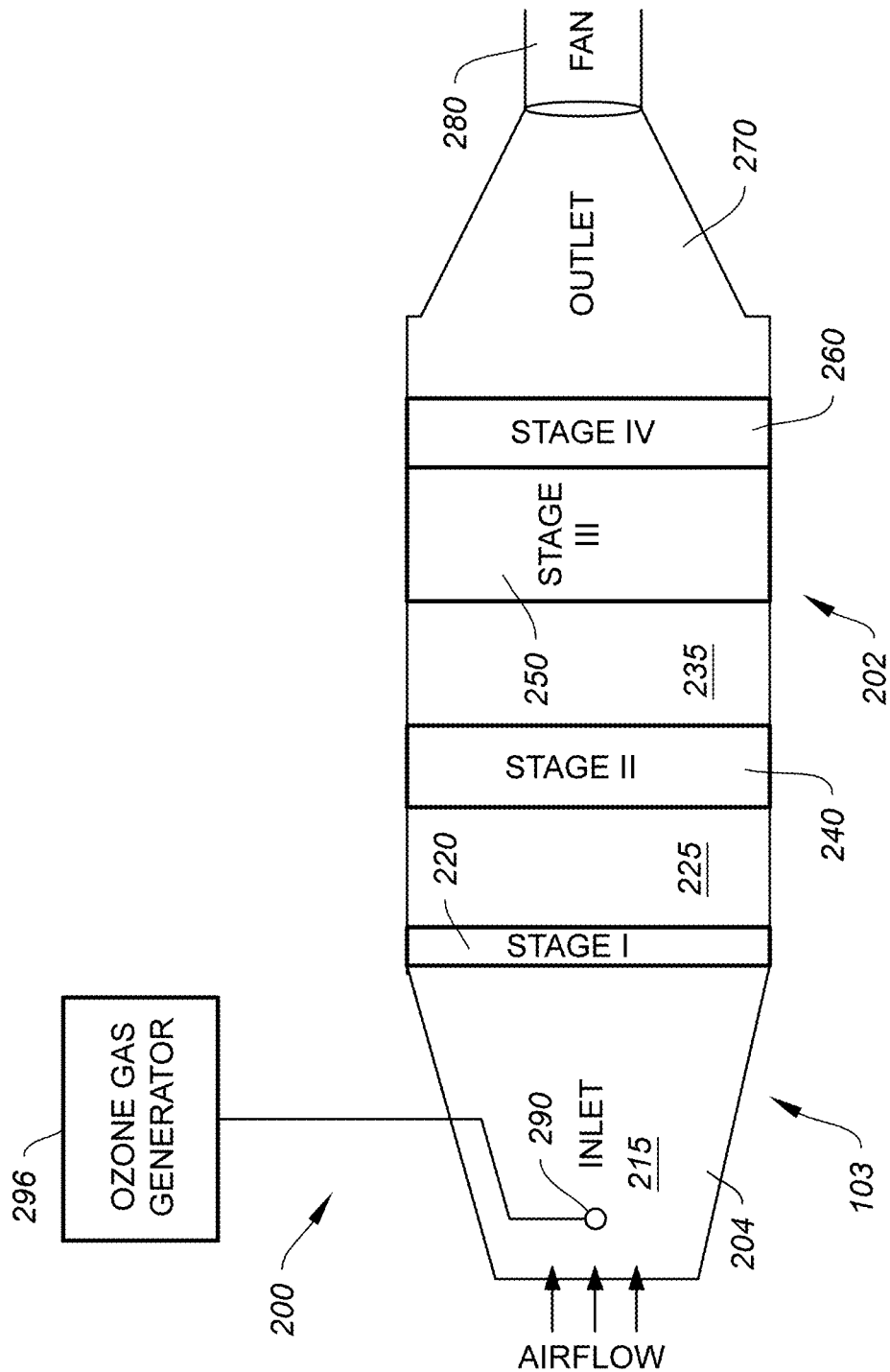
FIG. 19 is a block diagram of the air pollution control system similar to that of FIG. 18, but employing a PCO-based fourth stage filter.

FIG. 19 is a block diagram of the air pollution control system similar to that of FIG. 18, but employing a PCO-based fourth stage filter. Similar to FIG. 18 and as shown, FIG. 19 illustrates a system 200 with the fogger assembly 110 and wash mechanism 130 omitted; this is also referred to as a dry system. The PCO technology, however, is also applicable to previously described "wet" systems 100. An external ozone gas generator 296 is provided to inject gaseous ozone only (not activated ozone) into housing 202, such as via the ozone wand 290 into the annular space 215 between the inlet 204 and the stage I filter 220. In a wet system that utilizes fogging, the ozone can be introduced in a dissolved form. The AOPs, as to be described hereafter, are initiated downstream of the stage III filter 250, in a different stage IV filter 260 (e.g., the PCO filter) than has been previously described in the embodiments of FIGS. 1 and 18. Also unlike the embodiments of FIGS. 1 and 18, there is no sorbent present, or any sorbent serving as the stage IV filter 260 (or subsequent filter) in system 200. Generally, a sorbent as the stage IV filter 260 is not required unless ozone generating lamps are utilized or maximal VOC removal is required, as described in more detail hereafter.

In one example, the stage I filter 220 may be composed of a disposable synthetic media for filtering grease and particles in the waste airstream, such as a synthetic filter with an efficiency rating of MERV 6-10. In another example, the stage 1 filter 220 may be a washable metal filter which filters out particles down to a size of 1 micrometer on a size-based (tested to ASTM 2519 and published) increasing efficiency. In a further example to be described hereafter, the stage I filter 220 may be composed of a pleated wool material.

Similar to the previous embodiments, any particle and gas phase pollutants (i.e., particulate matter, semi-volatile and volatile organic compounds (sVOCs and VOCs)) that have not been removed from the waste airstream by the stage I filter 220 continue on into second annular space 225 to be filtered out by the stage II filter 240, which removes particulate matter at a second smaller particulate cut size than the stage I filter 220.

The stage II filter 240 may have the same construction as in FIGS. 1 and 18, e.g., a wool layer attached to a MERV 15 synthetic media for removing particle and gas phase pollutants remaining in the waste airstream after passing through the first stage filter 220. However, and unlike the previous embodiments, the stage II filter 240 may further include a specialized additive incorporated into the wool and synthetic material so that the second stage filter is adapted to achieve an efficiency rating of 95 DOP. As previously noted, with this additive, the efficiency of the stage II filter 240 may be increased to where the stage II filter 250 may be eliminated in system 200 in its entirety.

The stage III filter 250 is similar to that described with respect to the embodiments of FIGS. 1 and 18; namely, the stage III filter 250 may include a high efficiency (>95 DOP) media adapted to remove sub-micron particle pollutants remaining in the waste airstream after passing through the stage II filter 240. In one example, the stage III filter 250 may further include a proprietary media consisting of nano-fibers and glass (fiberglass) that enable it to achieve a HEPA filter efficiency performance at conventional 95 DOP pressure drop losses. This fiberglass media resistant to degradation by ozone and AOP. In another example, the stage III filter 250 may be embodied by a proprietary oil mist media and may be formed from a proprietary embossed manufacturing process to achieve HEPA 99 performance at a cost basis of a conventional 95 DOP filter.

Figure 21:
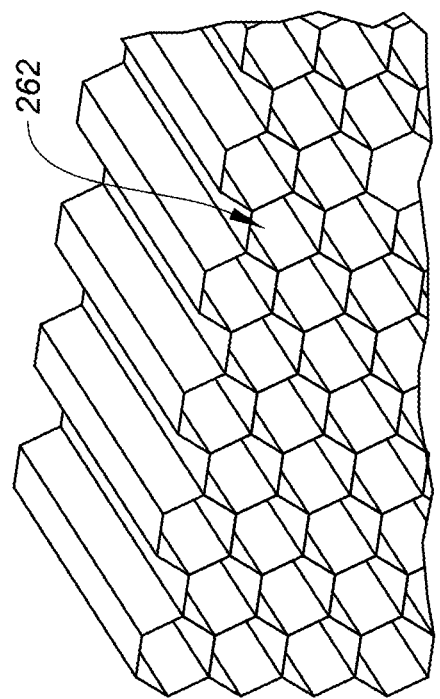
FIG. 21 is a portioned section of the PCO filter of FIG. 20 to show the honeycomb pattern in more detail.
Figure 20:
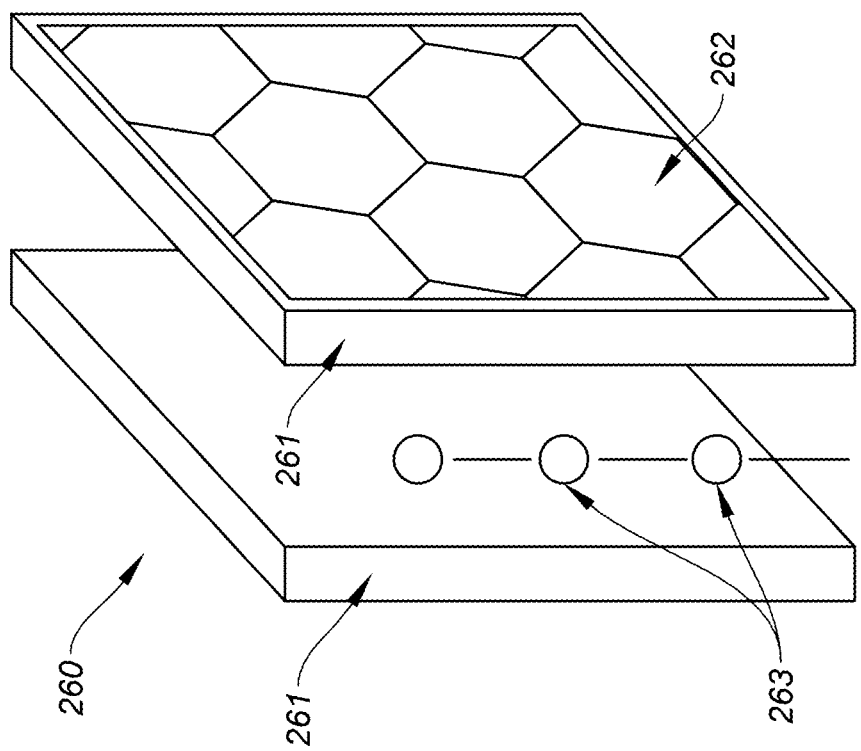
FIG. 20 is a cross-section of the PCO filter to show constituent components thereof.

FIG. 20 is a cross-section of the PCO filter 260 to show constituent components thereof; and FIG. 21 is a portioned section of the PCO filter 260 of FIG. 20 to show the honeycomb pattern in more detail. The waste airstream containing any remaining submicron particulate matter, sVOCs and VOCs that has not been removed by the stage III filter 250 continue on into third annular space 255, to be filtered out by a stage IV filter 260. Here, the stage IV filter 260 in general is embodied as a photocatalytic oxidation (PCO) system that oxidizes organic compounds by activation of a catalyst using ultraviolet light. More specifically, the stage IV filter 260 may be understood as a PCO filter 260 consisting of a bank of UV-C lights 263 interposed between a pair of aluminum metal filters 261 having interior honeycomb structures 262 that are coated with a catalyst of titanium dioxide ($TiO_2$).

The PCO filter 260 serves as a means for converting, in part or in whole, ozone that has been introduced to the housing 202, either directly or from another source upstream of the housing 202, to AOP. This facilitates a more rapid and efficacious decomposition of particle and gas phase pollutants within the waste airstream that are retained in the plurality of filters. The conversion of long half-life ozone to short half-life free radical of the AOP also serves to eliminate any unused excess ozone prior to discharge to the atmosphere.

Accordingly, the bank of UV-C lights 263 operate to emit, in one configuration, photons having a peak wavelength of about 254 nm to activate the $TiO_2$ and any excess ozone to AOP, so as to decompose volatile organic compounds (VOCs) and eliminate excess ozone. Namely, the 254 nm light activates the deposited $TiO_2$ catalyst, which in turn performs two functions. One is to oxidize any organic pollutants that have deposited on the catalyst surface. The second is to activate any free ozone that was injected in earlier filter stages (or before the inlet 204) to AOP. The light photons themselves also directly activate excess free ozone to AOP.

In another configuration, the lights 263 may be operated so that the photons have a different peak wavelength, namely about 185 nm (with or without the metal filters 261). The 185 nm light performs the same functions, but also serves to generate new ozone from any oxygen that still remains present in the waste airstream. Where the 185 nm lamp(s) are used, a stage V sorbent filter bank should be added to remove excess ozone. Further, the system 200 incorporating either lamp wavelength specificity can be modified by retaining only the bank of UV-C lights 263 and eliminating the metal catalyst filters 261, if desired. Depending on the wavelength of the emitted photons (254 or 185 nm), the bank 263 will emit photons to activate any excess ozone in system 200 to (AOP) and/or to generate new ozone from any oxygen that still remains present in the waste airstream, albeit to a lesser efficiency than with metal catalyst filters 261 in place.

Figure 22:
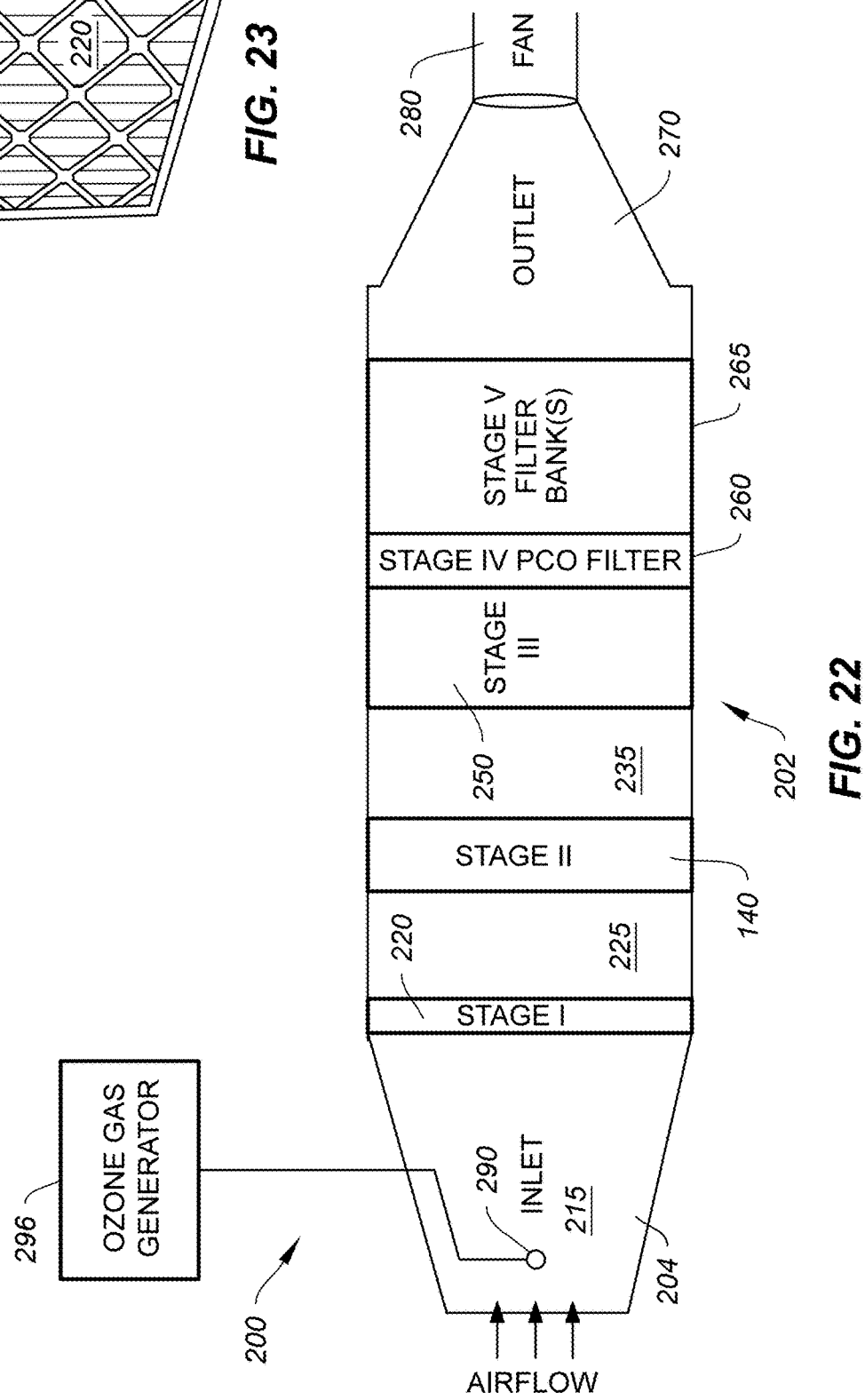
FIG. 22 is a block diagram of the air pollution control system of FIG. 19 employing a PCO-based fourth stage filter and a fifth stage sorbent filter.

FIG. 22 is a block diagram of the air pollution control system of FIG. 18 employing a PCO-based fourth stage filter and a fifth stage sorbent filter. As this is similar in most respects to FIGS. 18 and 19, only certain differences are noted. In system 200', here a stage V sorbent filter bank 265 may be used in conjunction with the stage IV PCO filter 260. For example, the stage V sorbent filter bank 265 may be embodied by any of the aforementioned configurations, such as the hydrophobic synthetic zeolite sorbent, or the two-pass filter system with first pass composed of the hydrophobic synthetic zeolite and second pass filter composed of an activated charcoal sorbent, or the blend of hydrophobic synthetic zeolite and activated charcoal.

Figure 23:
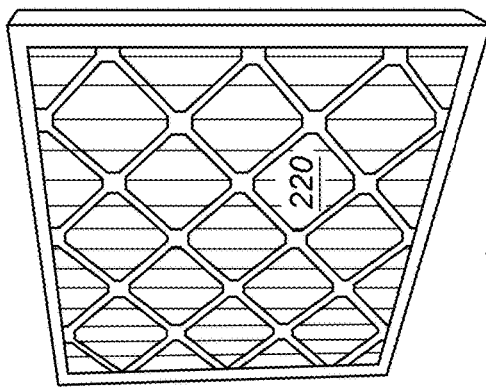
FIG. 23 is a block diagram of the air pollution control system of FIG. 19 employing a first stage filter having a wool material.

FIG. 23 is a perspective view of a first stage filter according to another embodiment that may be used in any of the systems shown in FIGS. 18, 19, and 22. Here, the stage I filter 220 is embodied as a disposable filter made of a synthetic fiber or a wool material. As one example, the stage I filter 220 may be embodied as a pleated or bag pocket-type filter composed of the wool material.

Figure 24:
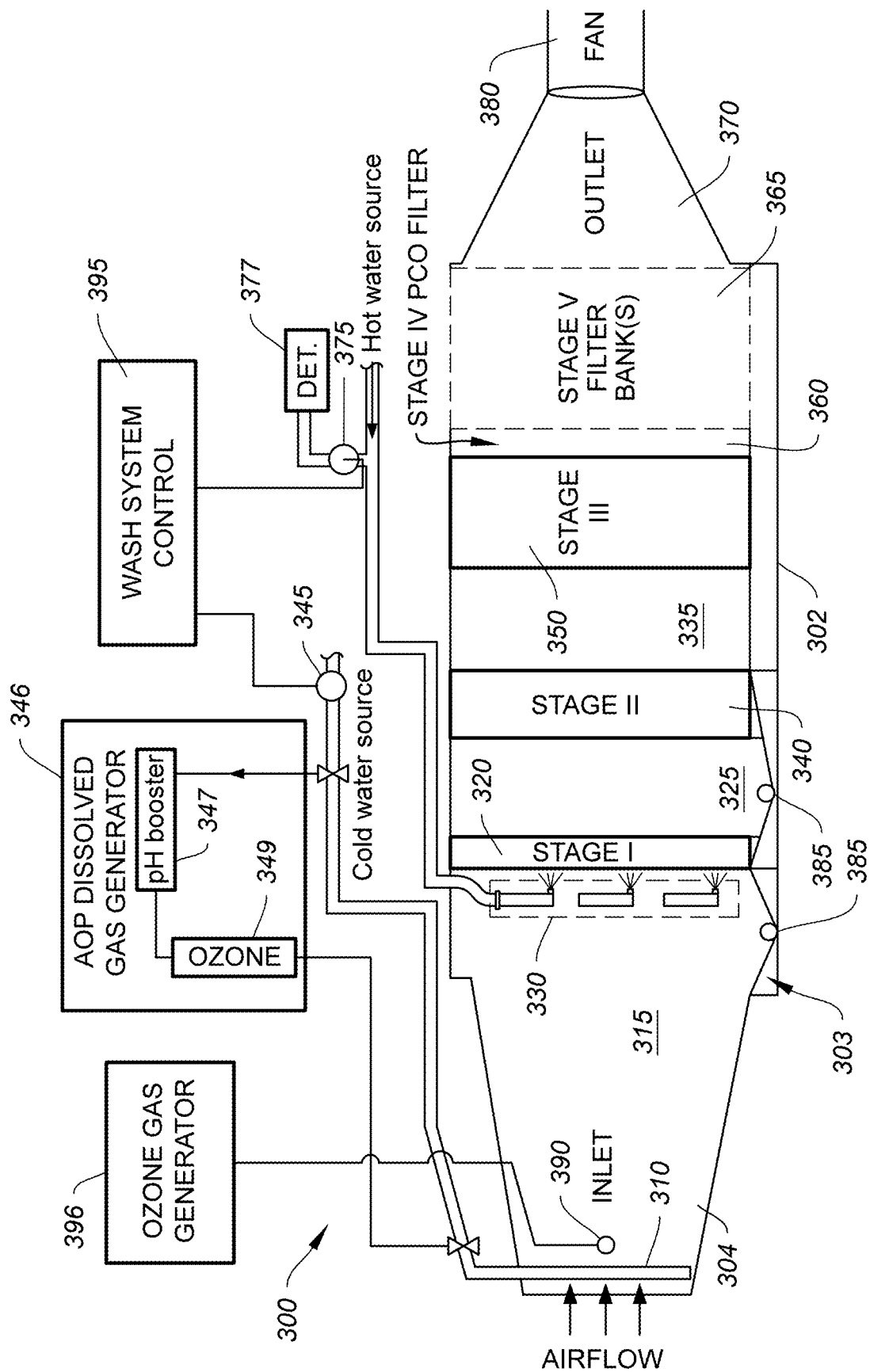
FIG. 24 is a block diagram of a wet, mechanical filter-based pollution control system according to another example embodiment employing a PCO-based fourth stage filter and a fifth stage sorbent filter.

FIG. 24 is a block diagram of a wet, mechanical filter-based pollution control system according to another example embodiment employing one or both of a PCO-based fourth stage filter and a fifth stage sorbent filter. For purposes of brevity, and as many of the elements in these figures are the same as in FIG. 1, only the differences are discussed in detail. Similar to FIG. 22, system 300 employ a single stage IV PCO filter 360, or a combination PCO filter as the fourth stage and a stage V sorbent filter bank 365 (shown in dotted line as optional). Filter bank 365 may be composed of the hydrophobic synthetic zeolite sorbent alone, of a two-pass filter system of hydrophobic synthetic zeolite and activated charcoal, or of a blend of hydrophobic synthetic zeolite and activated charcoal.

Figure 25:
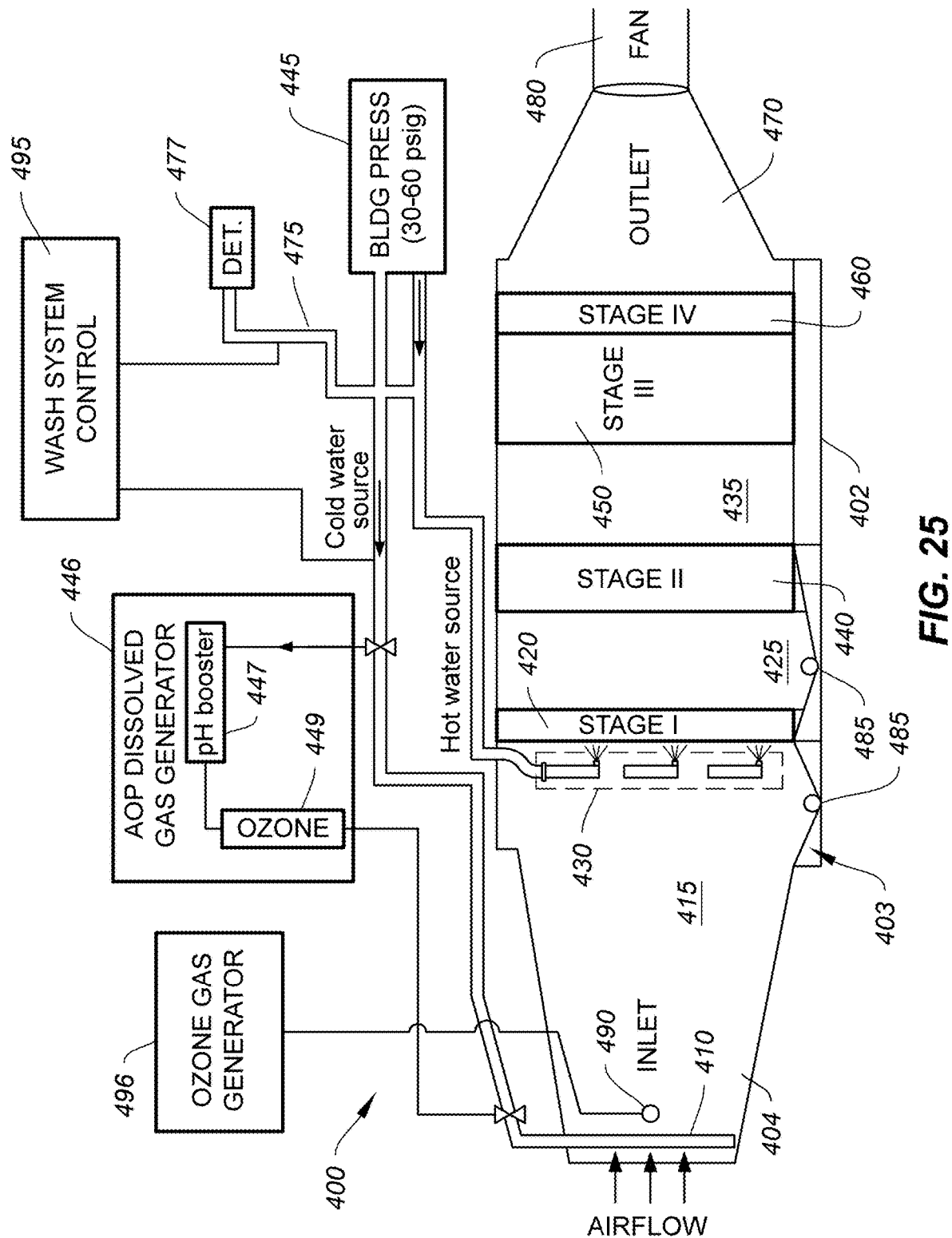
FIG. 25 is a block diagram of a wet air pollution control system for removing particle according to another embodiment which employs a non-mechanical water droplet source employing a PCO-based fourth stage filter.

FIG. 25 is a block diagram of a wet air pollution control system for removing particle according to another embodiment which employs a "non-mechanical" water droplet generation source employing a PCO-based fourth stage filter. As many of the elements in these figures are the same as in previous example embodiments, only the differences are discussed in detail. Referring to FIG. 25, in this embodiment there is shown a system 400 for removing particle and gas phase pollutants in the waste airstream exhausted from commercial cooking operations, which includes the housing with inlet and an outlet, and the exhaust fan attached to the outlet for drawing the waste airstream into the inlet and through the housing to the outlet and discharging to the outside atmosphere.

Unlike FIG. 1 however, system 400 does not include a supplemental mechanical means (such as supplemental air pressure or a powered pump) to generate smaller-sized water droplets. Rather, system 400 employs a non-mechanical water droplet generation source 445. In an example, source 445 may be a cold feed water source at a typical building pressure; namely a source of cold feed water operating at a pressure between 30 to 60 psig.

Here, the building pressure source is adapted to power fog assembly 410 to spray water droplets as a mist into the inlet 404, to mix with the incoming waste airstream. This is thus done without employing supplemental air or a pump to increase water pressure. In an example, the water droplets may be in the form of the aforementioned mist, with a diameter less than or equal to 100 micrometers. In another example, the water droplet size of each droplet in the mist has a diameter in a range of between about 20 to 100 micrometers. As shown, system 400 also includes the various stage filters arranged in adjacent spaced relation along the length of housing 402 to filter the particle and gas phase pollutants in the waste airstream.

Figure 26:
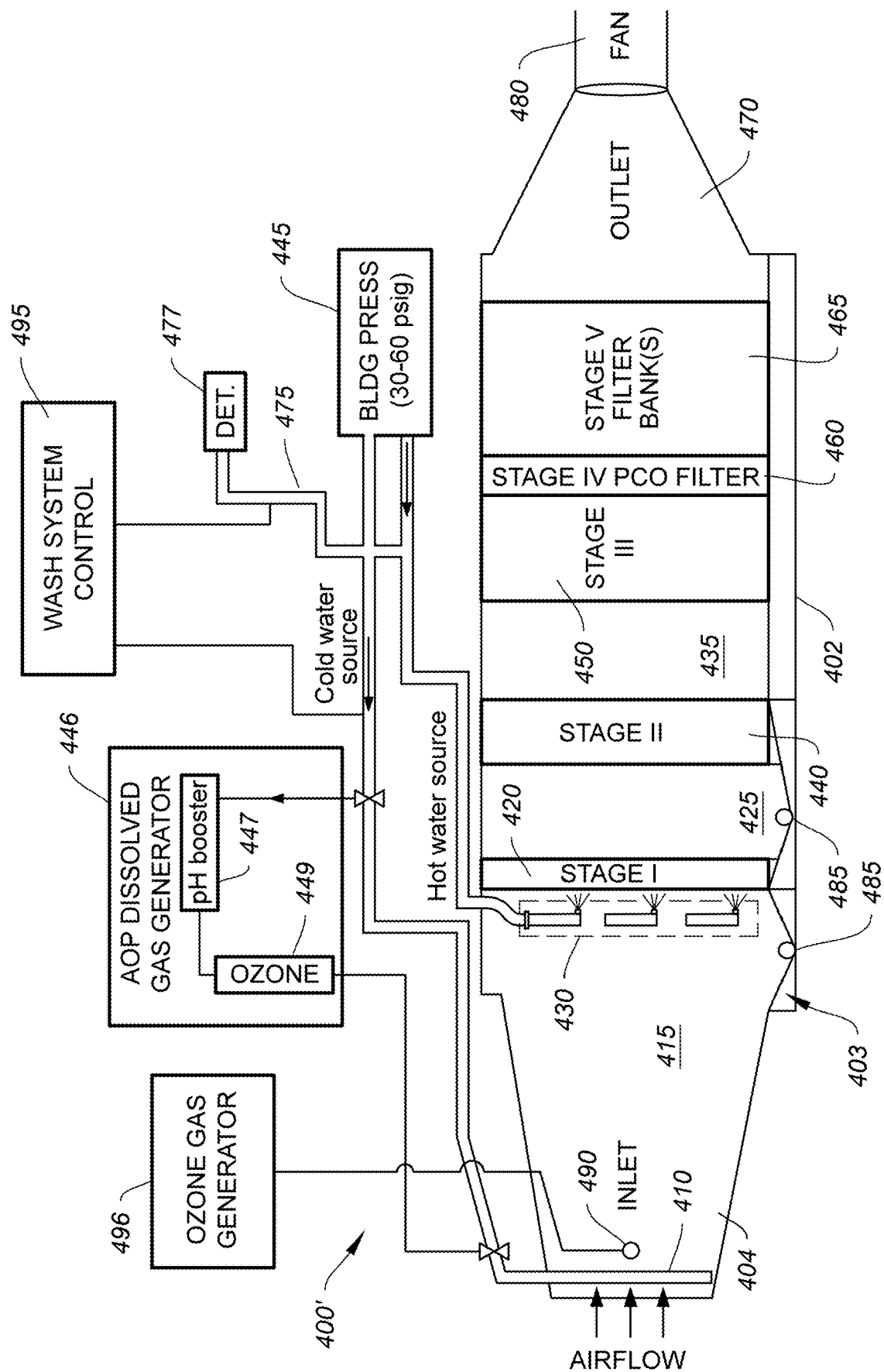
FIG. 26 is a block diagram of the air pollution control system of FIG. 25 employing a PCO-based fourth stage filter and a fifth stage sorbent filter.

FIG. 26 is a block diagram of the wet air pollution control system of FIG. 25 employing a PCO-based fourth stage filter and a fifth stage sorbent filter. Similar to FIGS. 22 and 25 here system 400' employs a combination stage IV PCO filter 360 and an optional stage V sorbent filter bank 465 including the hydrophobic synthetic zeolite sorbent alone, two-pass filter system of hydrophobic synthetic zeolite and activated charcoal, or blend of hydrophobic synthetic zeolite and activated charcoal.

The example embodiments being thus described, it will be obvious that the same may be varied in many ways. Such variations are not to be regarded as departure from the example embodiments, and all such modifications as would be obvious to one skilled in the art are intended to be included in the following claims.

I claim:

1. An air pollution control system for removing particle and gas phase pollutants in a waste airstream exhausted from commercial cooking operations, comprising:
   a housing having an inlet and an outlet,
   an exhaust fan attached to the outlet for drawing the waste airstream into the inlet and through the housing to the outlet and discharging to the outside atmosphere,
   a plurality of filters arranged in adjacent spaced relation along the length of the housing between the inlet and outlet for filtering the particle and gas phase pollutants in the waste airstream,
   a water droplet generation source adapted to spray water droplets into the inlet to mix with the incoming waste airstream, and
   a wash mechanism arranged in the housing in facing relation to a first of the plurality of filters, the wash mechanism including a plurality of spray nozzles supplying a mix of heated water and detergent for periodically washing surfaces of the first filter to remove grease therefrom;
   wherein the water droplet generation source further includes a fogger assembly powered by one of a mechanical or electrical source to spray a fog of water droplets having a diameter of 20 micrometers or less at the inlet to mix with the incoming waste airstream.

2. The system of claim 1, wherein the water droplet generation source is embodied as a building pressure water source operating at a pressure between 30 to 60 psig, and the building pressure water source adapted to spray a mist of water droplets, the droplets having a diameter between 20 and 100 micrometers.

3. The system of claim 1, wherein the mixing of droplets with the incoming waste airstream results in a psychrometric shift in the relative humidity of the airstream which evaporatively cools the airstream to a lower temperature, and condenses a portion of gas phase pollutants having boiling points below the lowered temperature of the waste airstream into condensed particles.

4. The system of claim 1, wherein the plurality of filters include a first stage washable metal filter arranged at the inlet and having an efficiency rating of MERV 6-10 for filtering out particles in the waste airstream.

5. The system of claim 1, wherein the plurality of filters include a second stage filter downstream of a first stage filter arranged at the inlet, the second stage filter including a wool layer attached to a MERV 15 synthetic media and adapted to remove particle and gas phase pollutants remaining in the waste airstream after passing through the first stage filter.

6. The system of claim 5, wherein the second stage filter further includes a specialized additive incorporated into the wool and synthetic material so that the second stage filter is adapted to achieve an efficiency rating of 95 DOP.

7. The system of claim 1, wherein the plurality of filters include a third stage filter arranged downstream of a second stage filter, the third stage filter including a high efficiency (>95 DOP) media adapted to remove sub-micron particle pollutants remaining in the waste airstream after passing through the second stage filter.

8. The system of claim 7, wherein the third stage filter further includes a proprietary media consisting of nanofibers that enable the third stage filter to achieve a HEPA filter efficiency performance at conventional 95 DOP pressure drop losses.

9. The system of claim 7, wherein the third stage filter further includes a proprietary oil mist media and is formed from a proprietary embossed manufacturing process to achieve HEPA 99 performance at a cost basis of a conventional 95 DOP filter.

10. The system of claim 1, wherein the plurality of filters include a fourth stage filter downstream of a third stage filter, the fourth stage filter having a sorbent composed of a blend of a hydrophobic synthetic zeolite and activated charcoal.

11. The system of claim 1, further comprising:
an optional ozone injection means adapted to inject ozone into the housing downstream of the inlet so as to decompose particle and gas phase pollutants within the waste airstream retained in the plurality of filters.

12. The system of claim 11, wherein the plurality of filters include a third stage filter arranged downstream of a second stage filter, the third stage filter having a fiberglass media resistant to degradation by ozone and Advanced Oxidation Processes (AOP).

13. The system of claim 11, wherein the plurality of filters include a fourth stage filter downstream of a third stage filter, the fourth stage filter embodied as a photocatalytic oxidation system that oxidizes organic compounds by activation of a catalyst using ultraviolet light.

14. The system of claim 1, further comprising:
means for generating dissolved ozone within the droplets in which the droplets evaporate to leave free ozone which oxidizes any pollutants remaining within the waste airstream after passing through the plurality of filters.

15. The system of claim 14, wherein the means for generating dissolved ozone includes a generating system based on a diamond cathode electrolytic technology, the generating system including filtration to remove solids within feed water that is used to generate the droplets.

16. The system of claim 14, wherein the dissolved ozone is converted to advanced oxidation processes (AOP) by elevation of the feed water pH and/or by injection of hydrogen peroxide in the feed water.

17. The system of claim 14, wherein the plurality of filters include a fourth stage filter downstream of a third stage filter, the fourth stage filter embodied as a photocatalytic oxidation system that oxidizes organic compounds by activation of a catalyst using ultraviolet light.

18. The system of claim 14, wherein the plurality of filters include a fourth stage filter downstream of a third stage filter, the fourth stage filter embodied as a photocatalytic oxidation (PCO) filter including a bank of UV-C lights interposed between a pair of metal filters with interior honeycomb structures that are coated with $TiO_2$.

19. The system of claim 18, wherein the bank of UV-C lights operate at a peak wavelength of 254 nm to activate the $TiO_2$ and any excess ozone to Advanced Oxidation Processes (AOP) so as to decompose volatile organic compounds (VOCs) and eliminate excess ozone.

20. The system of claim 1, further comprising:
a bank of UV-C lights, the photons emitted therefrom adapted to activate any excess ozone present in the system to AOP.

21. An air pollution control system for removing particle and gas phase pollutants in a waste airstream exhausted from commercial cooking operations, comprising:
a housing having an inlet and an outlet;
an exhaust fan attached to the outlet for drawing the waste airstream into the inlet and through the housing to the outlet and discharging to the outside atmosphere; and
a plurality of filters arranged in adjacent spaced relation along the length of the housing between the inlet and outlet for filtering the particle and gas phase pollutants in the waste airstream,
wherein a filter of the plurality of filters includes an activated charcoal sorbent, and
wherein a filter of the plurality of filters includes a synthetic, hydrophobic zeolite sorbent adapted to catch gas phase pollutants having a molecular diameter in a range between about 0.3 nanometers to 1.0 nanometers.

22. The air pollution system of claim 21, wherein:
the plurality of filters include a first stage filter arranged at the inlet and upstream of a second stage filter, the second stage filter arranged upstream of a third stage filter, and the third stage filter arranged upstream of a fourth stage filter; and
wherein the fourth stage filter is configured as a two-pass filter system such that the first pass filter includes the activated charcoal sorbent, and the second pass filter includes the synthetic, hydrophobic zeolite sorbent.

23. The air pollution system of claim 21, wherein the plurality of filters include a first stage filter arranged at the inlet and upstream of a second stage filter, the second stage filter arranged upstream of a third stage filter, and the third stage filter arranged upstream of a fourth stage filter.

* * * * *